(12) United States Patent
Chan et al.

(10) Patent No.: US 8,073,040 B1
(45) Date of Patent: *Dec. 6, 2011

(54) SERIAL COMMUNICATIONS CONTROL PLANE WITH OPTIONAL FEATURES

(75) Inventors: Allen Chan, Fremont, CA (US); Faisal Dada, Ottawa (CA); Karl Lu, Nepean (CA); Bryon Moyer, Cupertino, CA (US); Venkat Yadavalli, Santa Clara, CA (US); Arye Ziklik, Sunnyvale, CA (US)

(73) Assignee: Altera Corporation, San Jose, CA (US)

( * ) Notice: Subject to any disclaimer, the term of this patent is extended or adjusted under 35 U.S.C. 154(b) by 2059 days.

This patent is subject to a terminal disclaimer.

(21) Appl. No.: 10/923,540

(22) Filed: Aug. 20, 2004

(51) Int. Cl.
*H04B 1/38* (2006.01)

(52) U.S. Cl. ........ 375/219; 375/216; 375/224; 375/238; 375/222

(58) Field of Classification Search .......... 375/219, 375/222, 224, 238; 710/305; 714/781, 798, 714/700
See application file for complete search history.

(56) References Cited

U.S. PATENT DOCUMENTS

| | | | | |
|---|---|---|---|---|
| 5,377,122 | A * | 12/1994 | Werner et al. | 716/102 |
| 5,838,179 | A * | 11/1998 | Schmidt | 327/156 |
| 6,038,400 | A * | 3/2000 | Bell et al. | 710/11 |
| 6,275,526 | B1 * | 8/2001 | Kim | 375/238 |
| 6,295,627 | B1 * | 9/2001 | Gowni et al. | 716/104 |
| 6,401,230 | B1 * | 6/2002 | Ahanessians et al. | 716/1 |
| 6,581,114 | B1 * | 6/2003 | Sturm | 710/100 |
| 6,624,659 | B1 * | 9/2003 | Abraham et al. | 326/82 |
| 6,865,222 | B1 * | 3/2005 | Payne | 375/224 |
| 7,203,240 | B2 * | 4/2007 | Kim et al. | 375/240.28 |
| 7,228,509 | B1 * | 6/2007 | Dada et al. | 716/102 |
| 2002/0105966 | A1 | 8/2002 | Patel et al. | |
| 2005/0278682 | A1 * | 12/2005 | Dowling | 716/18 |

OTHER PUBLICATIONS

ALTERA ( SerialLite protocol overview, WP-serialt-1.1, Jul. 2004, ver.1.1, pp. 1-15).*

"IEEE Std 802.3-2002, Section One; Local and Metropolitan Area Networks, Information technology—telecommunications and information exchange between systems—Local and metropolitan area networks—specific requirements—Part 3: Carrier Sense Multiple Access with Collision Detection (CSMA/CD) access method and physical layer specifications." pp. 1-135, (c) 2002 IEEE.

"Draft Supplement to IEEE Std.802.3; IEEE draft P802.3ae/D5.0," May 1, 2002, pp. 295-308.

"Aurora Protocol Specification; SP002(v1.1)," pp. 1-64, protocol specification of Xilinx, Inc. (Feb. 14, 2003).

(Continued)

*Primary Examiner* — Shuwang Liu
*Assistant Examiner* — Helene Tayong
(74) *Attorney, Agent, or Firm* — Treyz Law Group; G. Victor Treyz; David C. Kellogg

(57) ABSTRACT

A serial communications protocol is provided that has mandatory features such as an idle code feature and optional features such as an optional automatic lane polarity reversal feature and an optional automatic lane order reversal feature, an optional clock tolerance compensation feature, an optional flow control feature, and an optional retry-on-error feature. A user that desires to create a protocol-compliant integrated circuit design can either choose to include or to not include the optional features. Integrated circuits in which the optional features are implemented are able to perform the associated functions. Integrated circuits in which the optional features have not been implemented are not able to perform these functions, but can be fabricated using fewer circuit resources.

21 Claims, 21 Drawing Sheets

OTHER PUBLICATIONS

"InfiniBand Architecture Specification vol. 1, Release 1.1" Nov. 6, 2002, pp. 1-211, Specification of the InfiniBand Trade Association.

"InfiniBand Architecture Specification vol. 2, Release 1.1" Nov. 6, 2002, pp. 1-163, Specification of the InfiniBand Trade Association.

"CompactPCI Serial Mesh Backplane Specification; PICMG 2.2 R1.0," Oct. 21, 2002, pp. i-vi and 1-37 Specification of the PCI Industrial Computer Manufacturers Group.

"CSIX-L1: Common Switch Interface Specification-L1," pp. i-v and 1-63, Aug. 5, 2000 Specification of CSIX of Palo Alto, CA.

"RapidIO Interconnect Specification; Part VI: Physical Layer 1x/4x LP-Serial Specification," Rev. 1.2 Jun. 2000, pp. i-xx, VI-1 to VI-136 and Glossary-1 to Glossary-6.

PCI Express Base Specification, Rev. 1.0app. 34-40 and 119-220.

* cited by examiner

SERIAL COMMUNICATIONS CONTROL PLANE WITH OPTIONAL FEATURES

BACKGROUND OF THE INVENTION

This invention relates to serial communications, and more particularly, to serial communications protocols having optional serial communications features.

Serial communications formats are often used in modern electronics systems. Serial communications can be faster than parallel communications, use fewer pins, and, particularly when differential signaling schemes are used, can have higher noise immunity.

It can be challenging to handle serial data streams at high data rates (e.g., at data rates above several Gbps). As a result, it is often advantageous to support high-speed serial data communications using multiple smaller serial data paths operating in parallel. These smaller serial data paths are often referred to as "lanes."

A number of functions are involved in controlling the operation of a successful serial communications link. These functions include link initialization, idle character generation, insertion, and deletion, clock tolerance compensation, flow control, and retry-on-error, etc. Serial communications protocols in which these functions are mandatory can become "heavy" and require a large amount of resources to implement on an integrated circuit. Serial communications protocols that do not support these functions do not require as many resources to implement, but can be inadequate for many communications tasks.

SUMMARY OF THE INVENTION

In accordance with the present invention, a serial communications protocol is provided that allows a logic designer to decide whether or not to include link initialization features such as automatic lane polarity reversal and automatic lane order reversal link initialization and features such as clock tolerance compensation, flow control, and retry-on-error. When these features are implemented on a given integrated circuit, the circuit will automatically perform the operations necessary to control the serial communications link. If desired, resources can be conserved by choosing not to implement these features. Circuits without these features will still be compliant with the serial communications protocol and can still communicate with each other over an appropriately configured link.

Logic design tools are provided for designing integrated circuits compliant with the protocol. Integrated circuits constructed in accordance with the present invention may be programmable logic device integrated circuits or other suitable integrated circuits such as digital signal processing circuits, microprocessor circuits, application specific integrated circuits, etc.

Further features of the invention, its nature and various advantages will be more apparent from the accompanying drawings and the following detailed description of the preferred embodiments.

DETAILED DESCRIPTION OF THE PREFERRED EMBODIMENTS

The present invention relates to serial communications protocols. More particularly, the present invention relates to serial communications protocols with optional control plane functions such as optional link initialization functions, optional clock tolerance compensation functions, optional flow control functions, and optional retry-on-error functions. The invention also relates to computer-aided design tools that help logic designers design integrated circuits using such serial communications protocols. Another aspect of the invention relates to circuits that are compliant with these protocols and methods for using these circuits.

Serial communications may involve a single path (i.e., a single differential pair of signal wires over which data is conveyed in series) or may involve multiple parallel serial paths (called lanes). In a multi-lane arrangement, a relatively higher-rate serial link is formed from multiple parallel relatively lower-rate serial paths. For example, four lanes operating at about 3.125 Gbps may be used in parallel to provide a 12.5-Gbps serial link. This is merely one illustrative configuration. The data streams from any number of lower-rate serial channels may be combined to form a higher-rate serial link.

Some aspects of the present invention (e.g., lane polarity reversal) relate to the polarity of a pair of differential signal wires in a given lane and apply to both single-lane and multi-lane configurations. Other aspects of the present invention (e.g., automatic lane order reversal) apply to multi-lane configurations. These aspects of the invention may be used either together or separately if desired.

Figure 1:
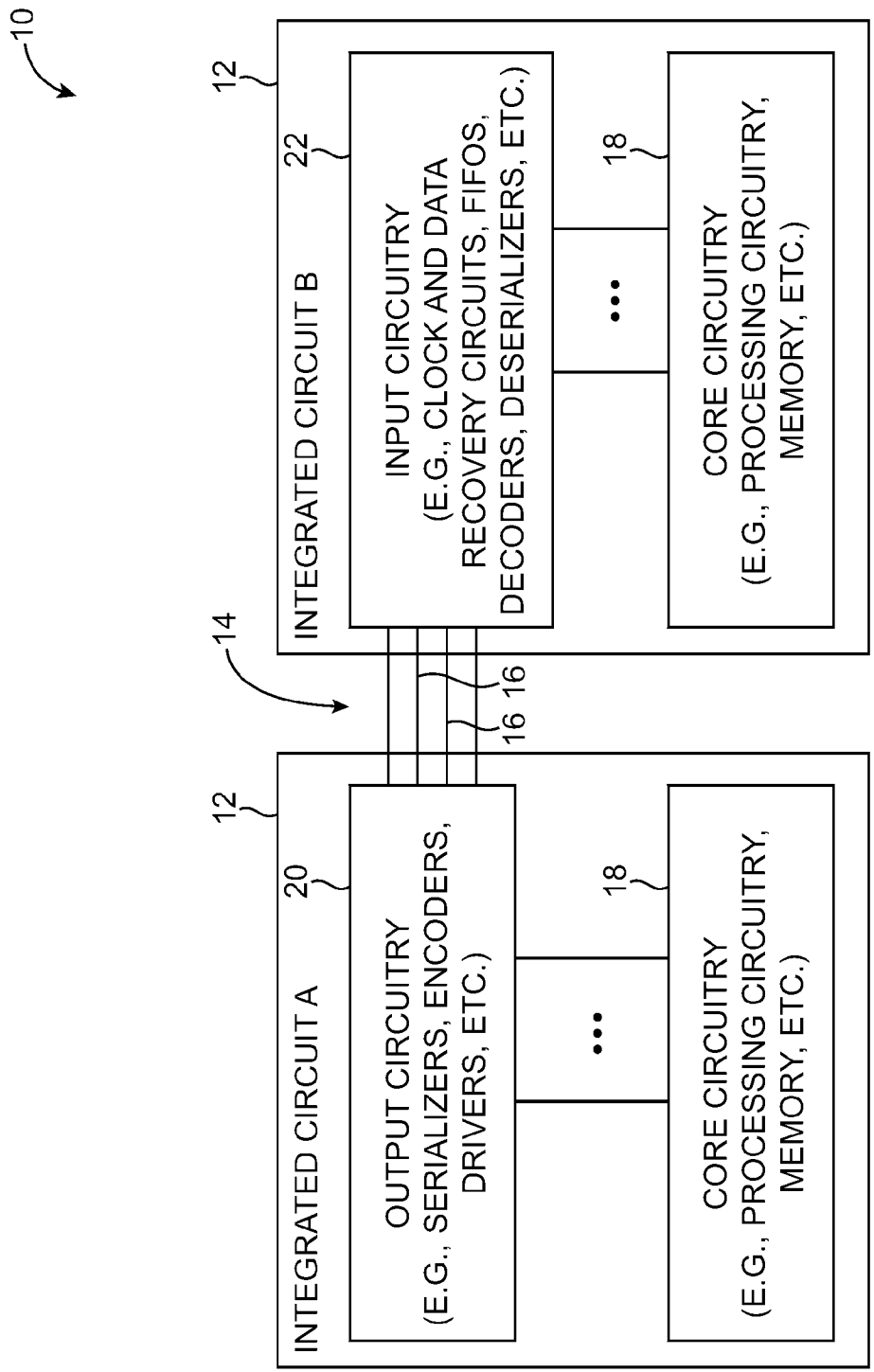
FIG. 1 is a diagram showing how two integrated circuits can communicate over a serial communications link made up of four parallel lanes using a serial communications protocol in accordance with the present invention.

Illustrative equipment 10 having two integrated circuits 12 that communicate over a serial communications link 14 is shown in FIG. 1. The integrated circuits 12 may be used in any suitable electronics equipment. For example, each integrated circuit 12 may be mounted on a different line card connected to a common system backplane in rack-mounted data processing or telecommunications equipment. As another example, integrated circuits 12 may be mounted on the same card or may be used in other types of electronic equipment. Each integrated circuit 12 may be, for example, a programmable logic device, a microprocessor, a digital signal processor, an application-specific integrated circuit (ASIC), etc.

Serial link 14 is generally a high-speed link having a data rate of many Gbps, although slower serial links may be used if desired. Link 14 is made up of a number of slower parallel serial links (lanes) 16. Each lane 16 may, for example, be formed from a differential signal path having a pair of conductors that support communications at a serial data rate of a few Gbps. One of the conductors in the pair is generally considered to be the "positive" line and one is considered the "negative" line. If the pair of conductors in a lane is inadvertently flipped, a positive output terminal at integrated circuit A may be electrically connected to a negative input terminal at integrated circuit B and the negative output terminal at circuit A may be connected to the positive input terminal at circuit B. This condition, which is known as lane polarity reversal, causes positive output signals from circuit A to be received as negative signals at circuit B.

Care may be taken to avoid lane polarity reversal conditions when possible. Nevertheless, inadvertent reversal conditions sometimes occur. When one of the circuits (e.g., integrated circuit B) has automatic lane polarity reversal capabilities, that circuit will automatically check for a lane polarity reversal condition and, if reversal is detected, the circuit will automatically reconfigure itself so that the signals are returned to their proper polarity before they are distributed further within the circuit.

The use of multi-lane serial links such as the illustrative four-lane link 14 of FIG. 1 to support communications between chips in an electrical system helps to overcome some of the difficulties associated with handling single-link serial data streams at extremely high data rates (e.g., 10 Gbps), because each of the lanes 16 has a lower data rate than would be required if all of their serial data were passed through a single pair of differential signal conductors.

Because each lane 16 may be connected and routed differently through equipment 10, the data streams on lanes 16 tend to become skewed with respect to each other (i.e., the data bits in one stream will be received at a time that is shifted ahead or behind the data bits of another stream). The different environments of each lane 16 will also generally cause the data streams on each lane to fall out of synchronization with each other. The clock associated with each lane 16 tends to be influenced by environmental factors during transmission. As a result, even if a common clock is used to transmit the signals over lanes 16, the clocks for lanes 16 will no longer be identical when they are received (i.e., the lanes 16 will no longer be synchronized). Deskewing and synchronization circuitry may be used to ensure that the data from the lanes is properly reconstructed at the receiving integrated circuit.

Another issue to be addressed concerns lane order. When multiple lanes are used in a link 14, the data from within a sending integrated circuit (e.g., a local circuit A) is distributed among the lanes 16 in a particular order. To properly reconstruct the data at the receiving integrated circuit (e.g., a remote integrated circuit B), the data must be received from each lane in the same order. If lanes are reversed (i.e., if lane 1 at circuit A is connected to lane 4 at circuit B), the link 14 will not function properly. Circuits with automatic lane order reversal capabilities can check to determine whether the order of the lanes within a given link 14 is correct during lane initialization procedures and, if a reversed condition is detected, appropriate corrective actions can be taken (e.g., by automatically reversing the lanes to their proper configuration at the receiving integrated circuit).

The local integrated circuit may insert idle characters to fill gaps in the data being transmitted over link 14 to the remote integrated circuit. This ensures that the link operates properly, even when no actual data is being transmitted in the gaps.

When separate clocks are used to operate the local and remote integrated circuits, the clock speeds of the local and remote integrated circuits will not match exactly. To compensate for this mismatch in clock speeds, the local integrated circuit can insert clock compensation characters into the outgoing data stream.

Sometimes the logic circuitry on a local integrated circuit is capable of generating data faster than the data can be accepted by the remote circuit. To prevent data from being transmitted too rapidly, the remote integrated circuit can issue flow control signals that direct the local circuit to temporarily stop transmitting data. This allows the remote integrated circuit to "catch up" to the local integrated circuit and prevents unnecessary data loss.

Integrated circuits that communicate over a serial communications link 14 can use a retry-on-error feature to help ensure the successful delivery of data to the remote integrated circuit. With this type of arrangement, the local integrated circuit that is transmitting the data can await confirmation from a remote integrated circuit that the data has been successfully received. If the data has been successfully received, the local integrated circuit can transmit additional data. If the data has not been successfully received, the local integrated circuit can resend the data.

In general, integrated circuits such as circuits 12 of FIG. 1 may have only transmitting circuitry, may have only receiving circuitry, or may have both transmitting and receiving circuitry. In the example of FIG. 1, integrated circuit A has core circuitry 18 that generates data. Output circuitry 20 may be used to serialize the data from core circuitry 18 and to encode the data to embed a clock in each data stream. Drivers in output circuitry 20 may be used to transmit the data from circuitry 18 to integrated circuit B over the multiple parallel lanes 16 of serial link 14.

At the receiving end of link 14, input circuitry 22 can be used to receive the transmitted data. The input circuitry 22 may include clock and data recovery circuits for extracting embedded clock signals, and first-in-first-out (FIFO) buffer circuitry for deskewing and synchronizing the incoming data on the parallel lanes 16. Input circuitry 22 may also include decoding circuitry for decoding data that was encoded in output circuitry 20 and deserializers for converting the serial data from lanes 16 to parallel data. The resulting data is provided to core circuitry 18 on integrated circuit B. Core circuitry 18 may be any type of circuitry, including programmable logic, microprocessor circuitry, digital signal processor circuitry, processing circuitry that is part of an application-specific integrated circuit, memory circuitry, etc.

A serial communications protocol in accordance with the present invention preferably has certain optional control plane functions such as optional link initialization functions, optional clock tolerance compensation functions, optional flow control functions, and optional retry-on-error functions. Because control plane features are optional, a logic designer can either include or not include support for features while still satisfying the protocol. A logic designer who is designing an integrated circuit and who decides to include an optional feature will benefit from the enhanced functionality the feature provides. If the logic designer decides not to include support for the optional feature in a given design, resources on the circuit that would otherwise need to be used for implementing the feature will be available to support other functions. For example, a microprocessor that does not include an optional serial communications feature can generally be constructed using less circuit real estate. As another example, forgoing an optional feature on a programmable logic device will free up programmable logic resources for use in supporting other functions on the device.

Although the present invention may be used in the context of any suitable integrated circuits that use serial communications (i.e., microprocessors, digital signal processors, application specific integrated circuits, etc.), the invention will sometimes be described in the context of programmable logic devices for clarity.

Figure 2:
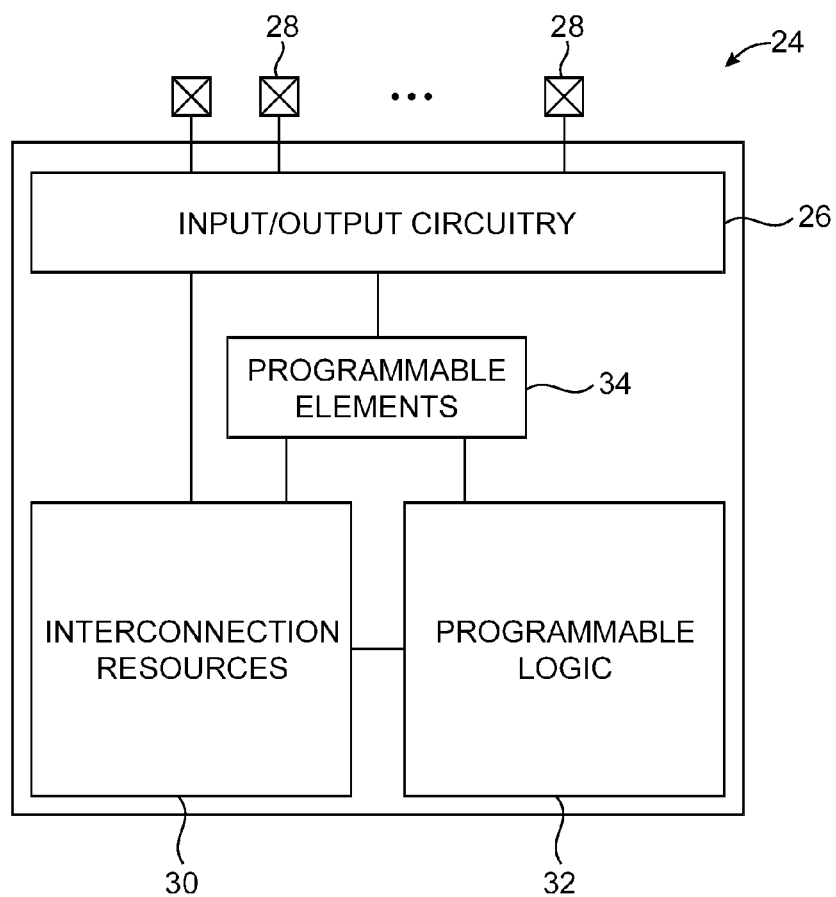
FIG. 2 is a diagram of an illustrative programmable logic device integrated circuit that may communicate using a serial communications protocol in accordance with the present invention.

An illustrative programmable logic device 24 in accordance with the present invention is shown in FIG. 2.

Programmable logic device 24 may have input/output circuitry 26 for driving signals off of device 24 and for receiving signals from other devices via input/output pins 28. Input/output circuitry 26 may include serial communications circuitry such as the output circuitry 20 and input circuitry 22 of FIG. 1. Certain pairs of pins 28 may be associated with respective pairs of differential signal conductors. Each pair of differential signals conductors may be associated with a respective lane 16 (FIG. 1) for supporting high-speed serial communications.

Interconnection resources 30 such as global and local vertical and horizontal conductive lines and busses may be used to route signals on device 24. Programmable logic 32 may include combinational and sequential logic circuitry including logic gates, multiplexers, switches, memory blocks, look-up-tables, logic arrays, etc. These illustrative components are not mutually exclusive. For example, look-up tables and other components that include logic gates and switching circuitry can be formed using multiplexers. Some of the logic of programmable logic device 24 is fixed. Programmable logic 32 includes components that may be configured so that device 24 performs a desired custom logic function.

Programmable logic device 24 may be based on any suitable programmable technology. With one suitable approach, configuration data (also called programming data) may be loaded into programmable elements 34 using pins 28 and input/output circuitry 26. The programmable elements (also sometimes called configuration bits or programmable function control elements) may each provide a static control output signal that controls the state of an associated logic component in programmable logic 32.

In a typical arrangement, the programmable elements 34 may be random-access memory (RAM) cells that are loaded from an external erasable-programmable read-only memory chip via certain pins 28 and appropriate portions of input/output circuitry 26. The loaded RAM cells 34 provide static control signals that are applied to the terminals (e.g., the gates) of circuit elements (e.g., metal-oxide-semiconductor transistors) in programmable logic 32 to control those elements (e.g., to turn certain transistors on or off) and thereby configure the logic in programmable logic 32. Circuit elements in input/output circuitry 26 and interconnection resources 30 are also generally configured by the RAM cell outputs as part of the programming process. The circuit elements that are configured in input/output circuitry 26, interconnection resources 30, and programmable logic 32 may be transistors such as pass transistors or parts of multiplexers, look-up tables, logic arrays, AND, OR, NAND, and NOR logic gates, etc.

RAM-based programmable logic device technology is merely one illustrative example of the type of technology that may be used to implement programmable logic device 24. Other suitable programmable logic device technologies that may be used for device 24 include one-time programmable device arrangements such as those based on programmable logic elements made from fuses or antifuses, programmable logic devices in which elements 34 are formed from electrically-programmable read-only-memory (EPROM) or erasable-electrically-programmable read-only-memory (EEPROM) technology, or programmable logic devices with programmable elements made from magnetic storage elements, etc.

Regardless of the particular type of programmable element arrangement that is used for device 24, programmable elements are preferably provided with configuration data by a user (e.g., a logic designer). Once provided with configuration data, the programmable elements 34 selectively control (e.g., turn on and off) portions of the circuitry in the programmable logic device 24 and thereby customize its functions so that it will operate as desired.

The circuitry of device 24 may be organized using any suitable architecture. As an example, the logic of programmable logic device 24 may be organized in a series of rows and columns of larger programmable logic regions or areas each of which contains multiple smaller logic regions or areas (e.g., areas of logic based on look-up tables or macrocells). These logic resources may be interconnected by interconnection resources such as associated vertical and horizontal interconnection conductors. Interconnection conductors may include global conductive lines that span substantially all of device 24, fractional lines such as half-lines or quarter lines that span part of device 24; staggered lines of a particular length (e.g., sufficient to interconnect several logic areas), smaller local lines that interconnect small logic regions in a given portion of device 24, or any other suitable interconnection resource arrangement. If desired, the logic of device 24 may be arranged in more levels or layers in which multiple large areas are interconnected to form still larger portions of logic. Still other device arrangements may use logic that is not arranged in rows and columns. Portions of device 24 (e.g., in input/output circuitry 26 and elsewhere) may be hardwired. As an example, hardwired transmitter and receiver circuitry may be used to assist in serial communications functions. Hardwired digital signal processing circuitry (e.g., multipliers, adders, etc.) may also be used.

Figure 3:
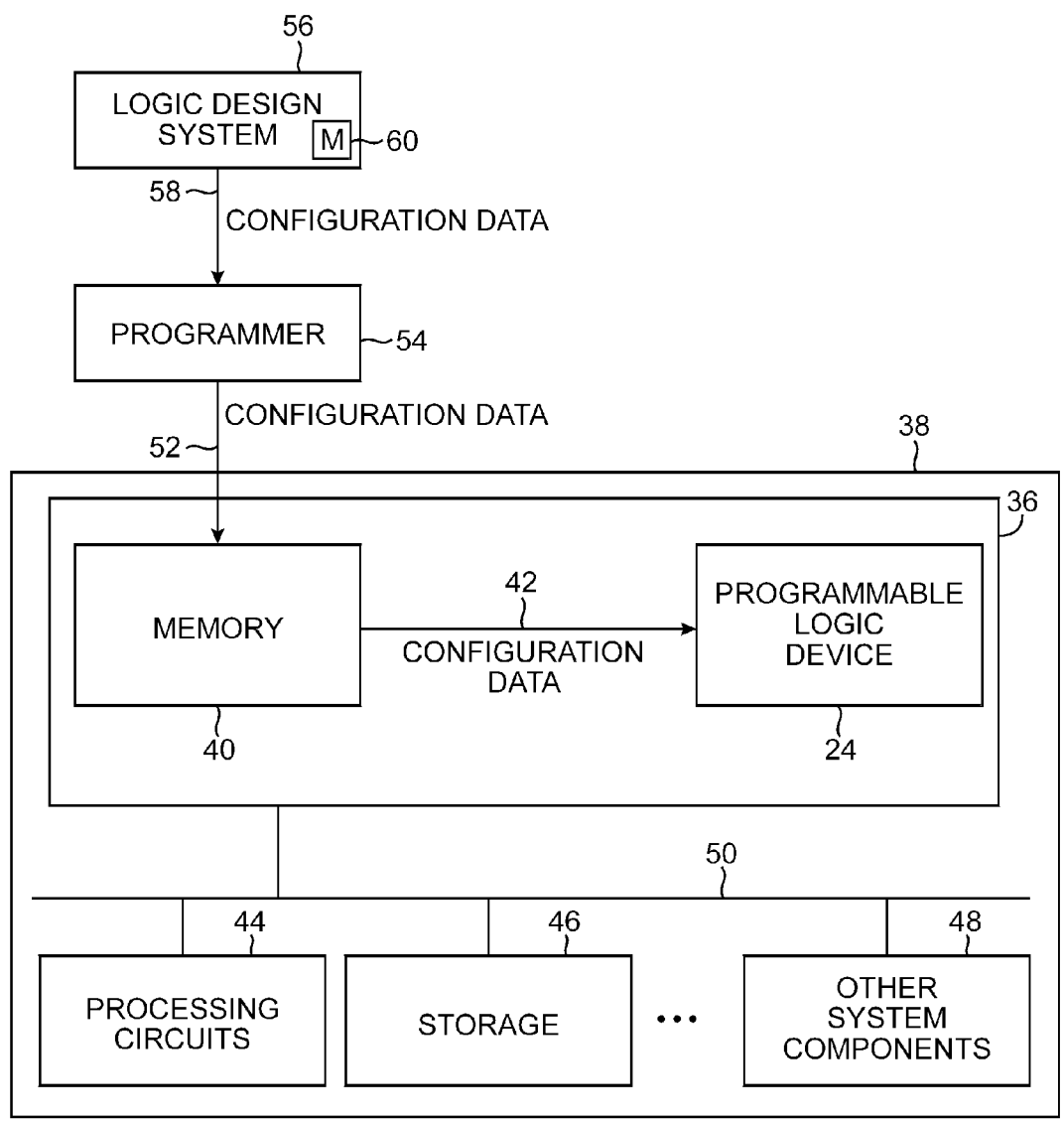
FIG. 3 is a diagram showing how configuration data may be generated for a programmable logic device integrated circuit in accordance with the present invention.

An illustrative system environment for a programmable logic device 24 is shown in FIG. 3. Programmable logic device 24 may be mounted on a board 36 in a system 38. In general, programmable logic device 24 may receive programming data from programming equipment or from any other suitable equipment or device. In the example of FIG. 3, programmable logic device 24 is the type of programmable logic device that receives configuration data from an associated memory chip 40. With this type of arrangement, memory chip 40 may, if desired, be mounted on the same board 36 as programmable logic device 24. The memory 40 may be an erasable-programmable read-only memory (EPROM) chip or other non-volatile memory device. When system 38 boots up (or at another suitable time), the configuration data for configuring the programmable logic device may be supplied to programmable logic device 24 from memory 40 via path 42. The configuration data that is supplied to the programmable logic device may be stored in the programmable logic device in configuration data cells (memory).

System 38 may include processing circuits 44, storage 46, and other system components 48 which may, if desired, contain circuitry that is compliant with the serial communications protocol of the invention. The components of system 38 may be located on one or more boards such as board 36 or other suitable mounting structures or housings and may be interconnected by busses and other electrical paths 50, which may include single-lane and multi-lane serial communications links.

Memory 40 may be supplied with the configuration data for device 24 over a path such as path 52. Memory 40 may, for example, receive the configuration data from a programmer 54 (e.g., an EPROM programmer) or other suitable equipment that stores this data in memory 40.

It can be a significant undertaking to design and implement a desired logic circuit in a programmable logic device and to perform other system design activities. Logic designers therefore generally want to use logic design systems based on computer-aided-design (CAD) tools to assist them in designing circuits and systems. A logic design system can help a logic designer design and test a complex circuit. When a design is complete, the logic design system may be used to generate configuration data for programming the appropriate programmable logic device or mask sets for creating a custom chip.

As shown in FIG. 3, the configuration data produced by a logic design system 56 may be provided to programmer 54 over a path such as path 58. The programmer 54 can program the configuration data into memory 40, so that memory 40 can later provide this configuration data to the programmable logic device 24 over path 42.

In arrangements of the type shown in FIG. 3, the programmable logic device 24 may have configuration data cells formed from memory cells such as static random-access memory cells. This is merely one illustrative arrangement for programming a programmable logic device 24. Any suitable arrangement for programming programmable logic device 24 may be used if desired. For example, programmable logic device 24 may be based on non-volatile configuration data cells such as erasable-programmable read-only memory (EPROM) cells. With this type of arrangement, device 24 can be configured by programming the configuration data into the EPROM cells on the device. Programmable logic device 24 may also be based on programmable elements such as fuses and antifuses or programmable elements based on other technologies (e.g., magnetic devices, etc.).

Regardless of the particular approach used for programming programmable logic device 24, programmable logic device 24 can be configured using configuration data produced by a logic design system 56.

Logic design system 56 includes storage 60. Software is used to implement the functions of system 56. The software may be stored on a computer-readable medium (storage) 60. Storage 60 may include computer memory chips, removable and fixed media such as hard disk drives, flash memory, compact discs (CDs), DVDs, and floppy diskettes, tapes, or any other suitable memory or storage device(s). When the software of system 56 is installed, storage 60 has instructions and data that cause the computing equipment in logic design system 56 to execute various methods (processes). When performing these processes, the computing equipment is configured to implement the functions of the logic design system 56.

Figure 4:
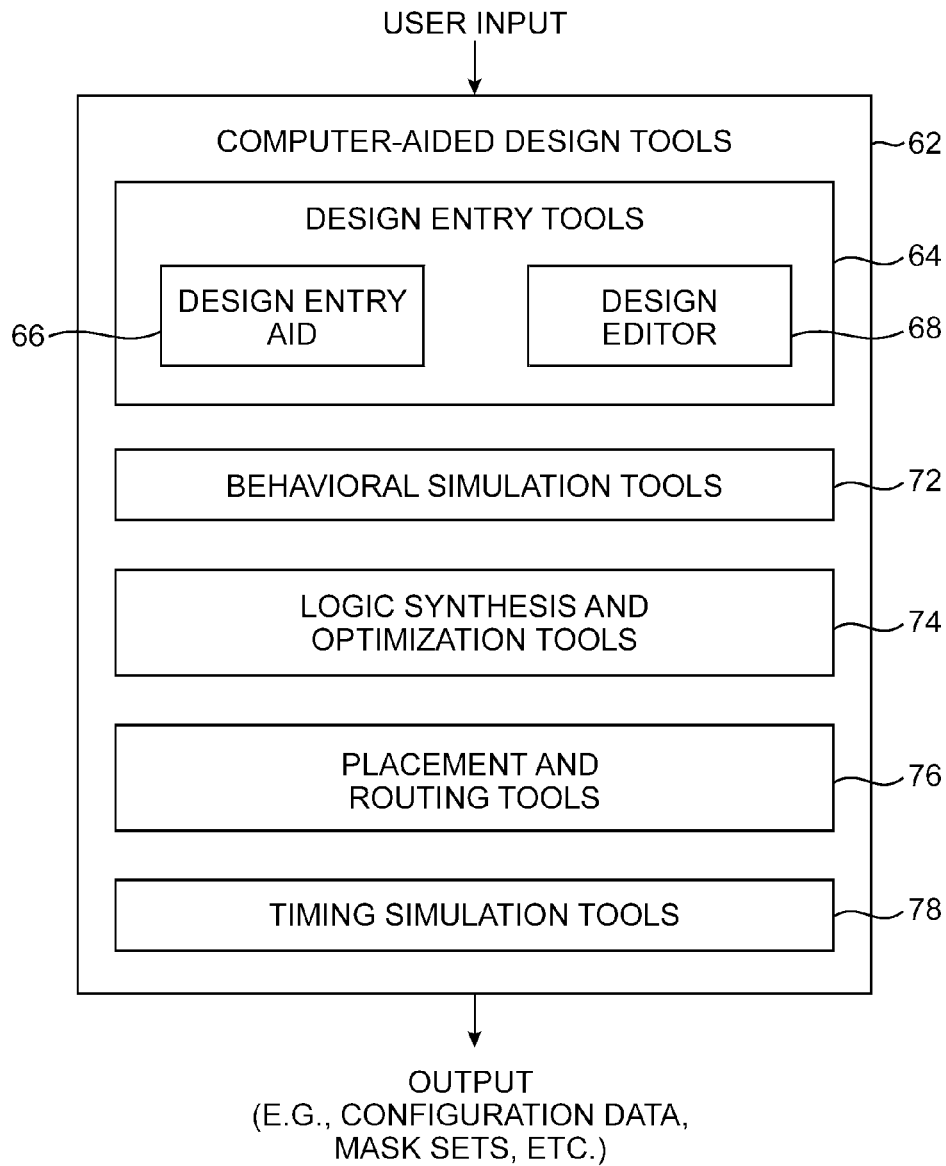
FIG. 4 is a diagram showing how computer-aided design tools may be used to create a logic design based on user input in accordance with the present invention.

Logic design system 56 may use computer-aided design tools such as tools 62 of FIG. 4. Tools such as tools 62 may be used to produce the configuration data for the programmable logic device 24 from a set of design specifications or other suitable input. Tools such as tools 62 can also be used to generate output in other suitable formats (e.g., as specifications for lithographic mask sets for semiconductor fabrication of a desired integrated circuit, etc.).

The design process typically starts with the formulation of logic circuit functional specifications. A logic designer can specify how a desired circuit should function using design entry tools 64. Design entry tools 64 may include tools such as design entry aid 66 and design editor 68. An illustrative design entry aid is the Altera MegaWizard design entry aid. Such design entry aids 66 help a logic designer locate a desired design from a library of existing logic designs and may provide computer-aided assistance to the logic designer for entering (specifying) the desired design. As an example, design entry aid 66 may be used to present screens of options for a user. Using these on-screen options, the user may select which optional control plane feature the user desires to implement in a given logic design. The user may, for example, click on the on-screen options to select whether or not the circuit being designed should have lane initialization capabilities such as an automatic lane polarity reversal or an automatic lane order reversal, clock tolerance compensation capabilities, flow control capabilities, and/or retry-on-error capabilities. Design editor 68 may be used to enter a design (e.g., by entering lines of hardware description language code), may be used to edit a design obtained from a library (e.g., using a design entry aid), or may assist a user in selecting and editing appropriate prepackaged code/designs.

Design entry tools 64 may be used to allow a logic designer to provide a desired logic design to logic system 62 using any suitable format. For example, design entry tools 64 may include tools that allow the logic designer to enter a logic design using truth tables. Truth tables can be specified using text files or timing diagrams and may be imported from a library. Truth table logic design entry may be used for a portion of a large circuit or for an entire circuit.

As another example, design entry tools 64 may include a schematic capture tool. A schematic capture tool may allow the logic designer to visually construct logic circuits from constituent parts such as logic gates and groups of logic gates. Libraries of preexisting logic circuits may be used to allow a desired portion of a design to be imported with the schematic capture tools.

If desired, design entry tools 64 may allow the logic designer to provide a logic design to the logic design system 56 using a hardware description language such as Verilog hardware description language (HDL) or Very High Speed Integrated Circuit' Hardware Description Language (VHDL). The logic designer can enter the logic design by writing hardware description language code with editor 68. Blocks of code may be imported from libraries if desired.

After the design has been entered using design entry tools 64, behavioral simulation tools 72 may be used to simulate the functional performance of the design. If the functional performance of the design is incomplete or incorrect, the logic designer can make changes to the design using design entry tools 64. The functional operation of the new design can be verified using behavioral simulation tools 72 before synthesis operations have been performed using tools 74. Simulation tools such as tools 72 may also be used at other stages in the design flow if desired (e.g., after logic synthesis). The output of the behavioral simulation tools 72 may be provided to the logic designer in any suitable format (e.g., truth tables, timing diagrams, etc.)

Once the functional operation of the logic design has been determined to be satisfactory, logic synthesis and optimization tools 74 may be used to implement the logic design in a particular programmable logic device (i.e., in the logic and interconnect resources of a particular programmable logic device product or product family). As an example, if the logic design has serial communications circuitry that supports automatic lane polarity reversal, the logic synthesis and optimization tools 74 may decide to use an available hardwired automatic polarity detection and reversal circuit on the programmable logic device to perform the desired polarity reversal function. Tools 74 may, alternatively, implement the polarity reversal functions using a "soft" design—i.e., using mostly or entirely programmable logic resources.

Tools 74 can optimize the design by proper selection of the available hardware to implement different logic functions in the logic design. Often tradeoffs are made because multiple logic functions are competing for limited resources.

After logic synthesis and optimization using tools 74, the logic design system may use tools such as placement and routing tools 76 to perform physical design steps (layout synthesis operations). Placement and routing tools 76 are used to determine how to place the circuits for each logic function within the programmable logic device. For example, if two counters interact with each other, the placement and routing tools 76 may locate these counters in adjacent logic regions on the programmable logic device to minimize interconnect delays. The placement and routing tools 76 create orderly and efficient implementations of logic designs for a given programmable logic device.

After an implementation of the desired logic design in the programmable logic device has been generated using placement and routing tools 76, the implementation of the design may be tested using simulation tools such as timing simulation tools 78. Timing simulation tools may, for example, predict the delay times that are associated with certain signal paths through the device. The timing simulation tools may be used to verify that the particular implementation of the design that is being tested does not contain signal paths with delays that are outside of the limits imposed during the design phase. For example, the timing simulation tools may be used to ensure that the slowest data paths are fast enough that the minimum desired clock speed and minimum signal path delay constraints are satisfied. The timing simulation tools may also examine the design for potential race conditions or other conditions that affect device performance.

After satisfactory testing using tools 78, the CAD tools 62 can produce the configuration data for the programmable logic device or can generate other suitable output data (e.g., the specifications for a lithographic mask set for fabricating an integrated circuit incorporating the logic design). Depending on the type of programmable logic device being used (e.g., a device based on non-volatile memory, a device based on volatile memory, a device based on fuses or antifuses, etc.), configuration data may be programmed into the programmable logic device directly or may be provided to a memory device that later (e.g., upon power-up) loads the configuration data into the programmable logic device to program the device.

To assist a logic designer in choosing whether or not to include optional control plane serial communications link functions such as link initialization functions, clock tolerance compensation functions, flow control functions, and retry-on-error functions, computer-aided design tools 62 (e.g., design entry tools 64) can provide the logic designer with on-screen options with which the logic designer can make choices. As an example, tools 64 may present a user with a screen containing clickable menu items that the user can select. The user may click on a link initialization option (or multiple options) to make a decision regarding whether or not to include automatic lane polarity reversal and automatic lane order reversal functions in the circuit. The user may click on an appropriate on-screen clock tolerance compensation option to include (or not include) clock tolerance compensation functions in the circuit. If the user desires to include flow control functions or retry-on-error functions in the circuit, the user may click on other appropriate on-screen options. The on-screen options may include buttons, drop-down menus, fillable boxes, tabs, or any other suitable graphical user interface options.

With the serial communications protocol of the present invention, control plane functions such as link initialization functions, clock tolerance compensation functions, flow control functions, and retry-on-error functions are optional serial communications features. If the user would like the circuit design to handle flow control commands (as an example), the user can select an option that includes flow control functionality into the circuit design. Similarly, the functionality for handling clock tolerance compensation operation, retry-on-error operations, and link initialization operations can be selectively incorporated into the circuit design by appropriate selection of the on-screen options that are presented by the design entry tools 64.

By using on-screen options or by otherwise providing the user with an opportunity to choose which optional control plane features to include in a given integrated circuit design, the computer-aided design tools 62 (e.g., the design entry tools such as design entry aid 66 and/or design editor 68) allow the user to increase functionality (at the expense of increased resource consumption) or allow the user to reduce resource consumption (at the expense of reduced functionality) while still producing a protocol-compliant design.

When the user has finished selecting the desired options for the design, the user may click on a "finish" option. The computer-aided design tools 62 (FIG. 4) may then be used to complete the design process.

If, for example, the logic designer is designing circuitry to be implemented in a programmable logic device, the computer-aided design tools 62 may be used to complete the design process by producing configuration data for programming a programmable logic device. The configuration data that is created will reflect the inclusion of the desired optional features that have been selected by the user. When loaded into a programmable logic device, the configuration data will configure the programmable logic on the device to implement the desired features while simultaneously configuring the programmable logic on the device so that resources are conserved by not implementing the undesired features. If desired, all of the optional control plane features may be include or all of the optional control plane features may be omitted.

If the logic designer is designing circuitry for an integrated circuit such as a microprocessor, digital signal processor, or other such circuit (including programmable logic devices) whose serial communications circuitry is exclusively or at least partially hardwired, the output of the computer-aided design tools 62 may be used to complete the design process by producing specifications for a lithographic mask set for fabricating the integrated circuit. The circuitry produced using the mask set will include the desired optional features (and will consume associated resources) and will not include the undesired features (while conserving associated resources).

Figure 5:
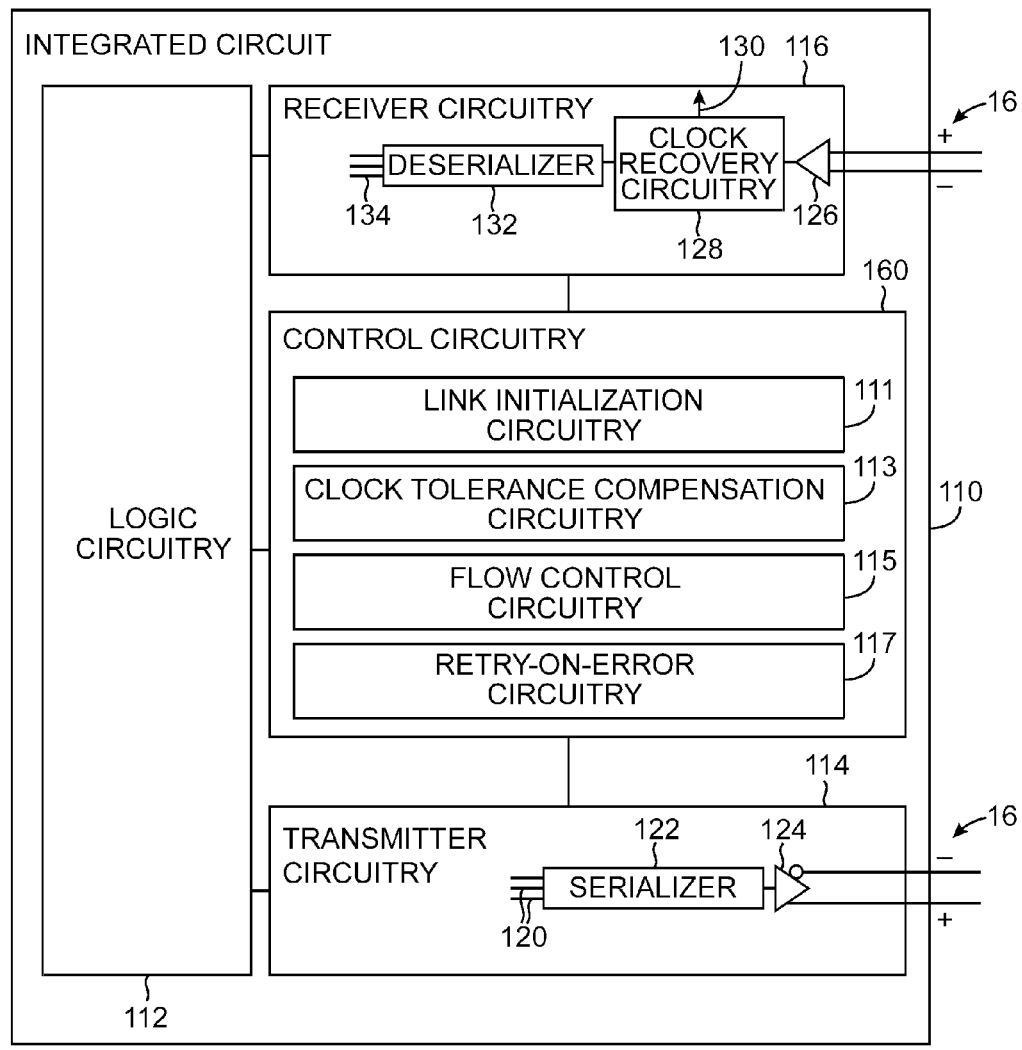
FIG. 5 is a diagram of an illustrative integrated circuit with serial communications circuitry constructed in accordance with the present invention.

A diagram of an illustrative integrated circuit 110 that includes circuitry suitable for performing the optional control plane functions such as the link initialization functions (link initialization circuitry 111), clock tolerance compensation functions (clock tolerance compensation circuitry 113), flow control functions (flow control circuitry 115), and retry-on-error functions (retry-on-error circuitry 117) is shown in FIG. 5. Integrated circuit 110 may be a programmable logic device, microprocessor, digital signal processor, application specific integrated circuit, or other suitable integrated circuit. If circuit 110 is a programmable logic device, logic circuitry 112 on integrated circuit 110 will typically include programmable logic such as programmable logic 32 of FIG. 2 and hardwired logic. For other types of integrated circuit, logic circuitry 112 is generally hardwired digital logic circuitry.

Integrated circuit 110 may transmit digital data signals from logic circuitry 112 to other integrated circuits using transmitter circuitry 114. Receiver circuitry 116 may be used to receive digital data signals for logic circuitry 112 from other integrated circuits.

Transmitter circuitry 114 and receiver circuitry 116 are controlled by control circuitry 160. The circuitry of control circuitry 160 (i.e., circuitry 111, 113, 115, and 117) and circuitry 114 and 116 need not be mutually exclusive. For example, link initialization operations may be performed using link initialization circuitry 111 and circuitry in receiver circuitry 116. As another example, retry-on-error circuitry 117 and transmitter circuitry 114 or clock tolerance compensation circuitry 113 may share on-chip resources. These are merely illustrative examples. In general, the circuitry used to implement the desired control plane and transmitter and receiver functions of circuit 110 may be implemented using any suitable scheme.

Transmitter circuitry 114 receives signals from logic circuitry 112. Parallel inputs 120 may be used to provide data from logic circuitry 112 to serializer 122. Serializer 122 may serialize parallel data on inputs 120 so that the data can be transmitted over a serial link having one or more lanes. A differential driver 124 may drive serial data from the output of serializer 122 onto two parallel differential signal lines in lane 16. In the example of FIG. 5, there is only a single lane 16 associated with transmitter circuitry 114. This is merely illustrative. In general there may be one or more parallel lanes in a given serial link 14, as shown in FIG. 1.

Receiver circuitry 116 of FIG. 5 has a differential input driver 126 that receives data from another integrated circuit over a lane 16. Only a single lane 16 is associated with the receiver circuitry 116 in the example of FIG. 5. This is merely illustrative. Multiple parallel lanes in a serial link may be associated with receiver circuitry 116 if desired.

The differential data at the two inputs of differential input driver 126 of receiver circuitry 116 is provided to clock-and-data recovery (CDR) circuitry 128. Clock-and-data recovery circuitry 128 extracts embedded clock information from the incoming signal and provides the extracted clock signals at line 130. Recovered serial data is provided to deserializer 132. Deserializer 132 deserializes the data provided by clock recovery circuitry 128 and provides corresponding parallel data at output lines 134. The parallel data from output lines 134 may be distributed to logic circuitry 112.

The receiver circuitry 116, control circuitry 160, and the transmitter circuitry 114 are used to support serial communications in accordance with the serial communications protocol of the present invention. In a given integrated circuit, the amount and type of circuit resources present in circuitry 114, 116, and 160 depends on which optional serial communications features were included by the logic designer. For example, during the design process, the logic designer may have clicked on a "lane polarity reversal or lane order reversal" option presented by tools 64 (FIG. 4). In this case, when the integrated circuit is implemented as a chip, the chip will have control circuitry 160 that includes link initialization circuitry 111 that is capable of automatically correcting an incorrect lane polarity and/or lane order. If, however, the logic designer clicked on an option presented by tools 64 that directed tools 64 not to include these lane initialization features, the chip will have control circuitry 160 that does not include lane initialization circuitry 111 capable of handling lane polarity reversals and lane order reversals.

Similarly, the logic designer may have clicked on a "clock tolerance compensation desired" option presented by tools 64 during the design process. In this case, when the integrated circuit is implemented as a chip, the chip will have control circuitry 160 that includes clock tolerance compensation circuitry 113. If, however, the logic designer clicked on an option presented by tools 64 that indicates that there should be no clock tolerance compensation, the chip will have control circuitry 160 that does not include clock tolerance compensation circuitry 113.

The situation is similar for the flow control and retry-on-error features. If the user chose to include these functions in the design, the circuit will be implemented such that control circuitry 160 includes flow control circuitry 115 and retry-on-error circuitry 117. If the user chose not to include these functions in the design, the circuit will be implemented such that control circuitry 160 does not include flow control circuitry 115 and retry-on-error circuitry 117.

These different implementations—i.e., the chips that have and that do not have some or all of circuitry 111, 113, 115, and 117—are compliant with the serial communications protocol of the present invention. The implementations with fewer or none of these control plane features will consume fewer logic resources on the integrated circuit and may therefore be less complex and less expensive. The implementations with relatively more (or all) of these control plane features will have added functionality.

Figure 6:
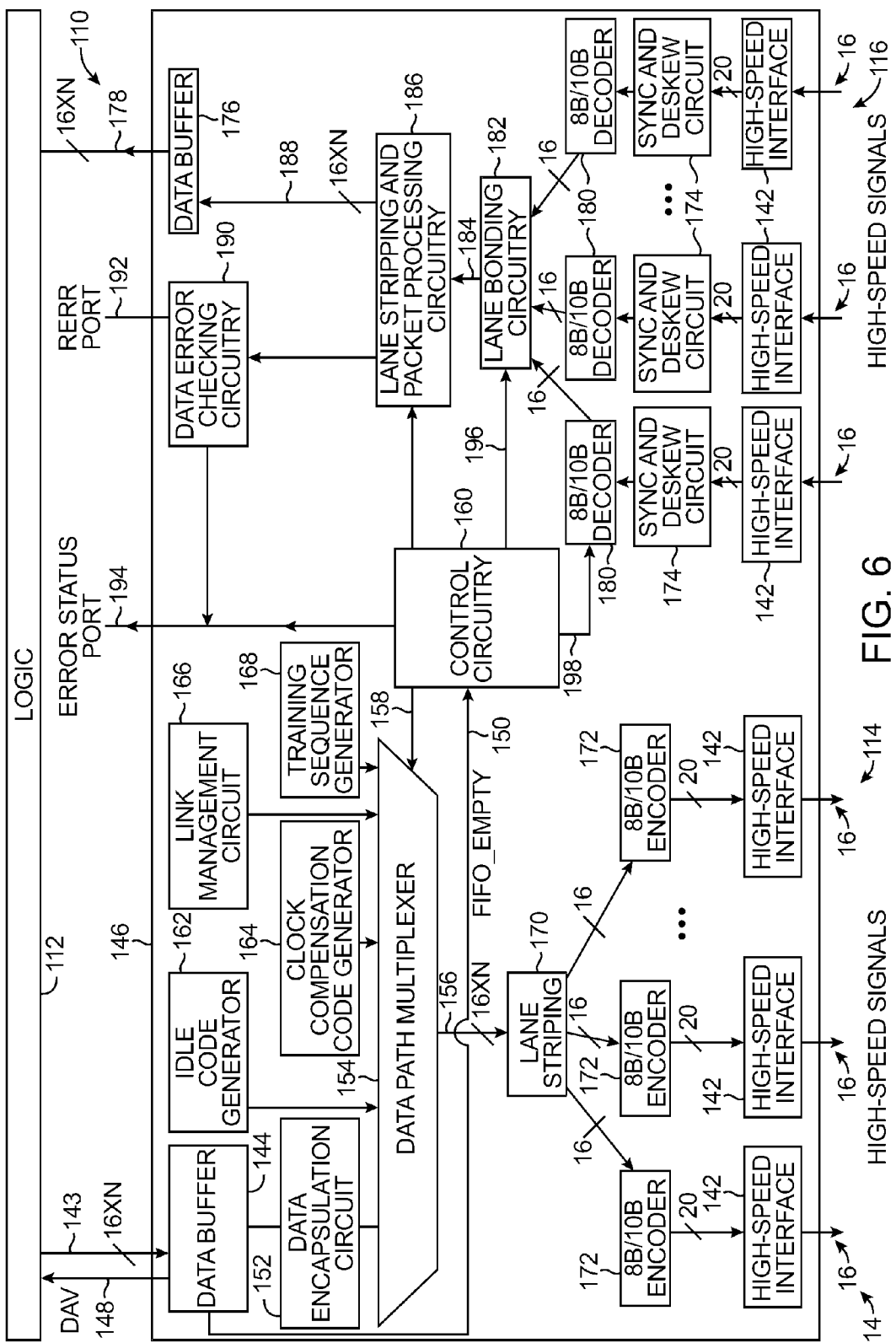
FIG. 6 is a more detailed diagram of an illustrative integrated circuit with serial communications circuitry constructed in accordance with the present invention.

An illustrative integrated circuit 110 which may be used to transmit and receive serial data in accordance with the serial communications protocol of the present invention is shown in FIG. 6. Integrated circuit 110 of FIG. 6 has input/output circuitry 146. Input/output circuitry 146 may, for example, be input/output circuitry such as circuitry 26 of FIG. 2 for integrated circuits 110 that are programmable logic devices.

Input/output circuitry 146 of integrated circuit 110 includes serial communications circuitry. For example, input/output circuitry 146 has transmitter circuitry 114 for transmitting data over one or more lanes 16 of serial link 14. Integrated circuit 110 also has receiver circuitry 116 for receiving serial communications from another integrated circuit over one or more lanes 16. High-speed interface circuitry 142 in the transmitter circuitry 114 includes serializer and driver circuitry such as serializer 122 and driver 124 of FIG. 6. High-speed interface circuitry 142 in the receiver circuitry 116 may include components such as the differential input driver 126, clock-and-data recovery circuitry 128, and deserializer circuitry 132 of FIG. 6.

Each lane 16 has two differential signal lines—a positive (+) line and a negative (−) line (shown in more detail in FIG. 5). To support two-way traffic, link 14 has both outgoing pairs of signal lines connected to transmitter circuitry 114 and incoming pairs of signal lines connected to receiver circuitry 116. The number of lanes 16 in link 14 is given by the integer N in FIG. 6. The value of N may be 1 (in a single-lane link) or may be more than 1. As an example, in a four-lane serial link 14 having four outgoing pairs of differential signal lines and having four incoming pairs of differential signals lines, the value of N is 4.

Data to be transmitted over link 14 from integrated circuit 110 to another integrated circuit is passed from logic 112 to data buffer 144 over paths such as path 143. In the example of FIG. 6, data words have 16 bits and the size of path 143 is N×16, where N is the number of lanes in link 14 (as an example).

Buffer 144 may be used to help provide an interface between logic 112 and input-output circuitry 146. When no more data can be accepted from logic 112 because the buffer is full (e.g., because first-in-first out (FIFO) circuitry in buffer 144 is full), the DAV signal on line 148 may be deasserted. Logic 112 may monitor the status of DAV to determine whether or not buffer 144 is ready to accept data. When the FIFO (or other suitable buffer circuitry) in buffer 144 is empty, the FIFO_EMPTY signal on line 150 may be asserted. When control circuitry 160 receives a FIFO_EMPTY signal from data buffer 144, the control circuitry 160 may insert idle codes into the outgoing data.

If desired, data from data buffer 144 may be encapsulated as packets using data encapsulation circuit 152. During the encapsulation process, a data payload may be encapsulated between start-of-packet (SOP) and end-of-packet (EOP) markers.

A data path multiplexer 154 or other suitable signal routing circuitry may be used to route the data to be transmitted to the final stages of the transmitter. Data path multiplexer 154 may have multiple inputs and a single output 156.

Control circuitry 160 may control the operation of input/output circuitry 146. For example, control circuitry 160 may control data path multiplexer 154 via control path 158. By controlling which control signals are applied to data path multiplexer 154 via control path 158, the control circuitry 160 can select which of the data path multiplexer's inputs is connected to the output 156. When, for example, it is desired to transmit data from data buffer 144 over link 14, the control circuitry 160 can direct the multiplexer 154 to connect the input connected to data encapsulation circuit 152 to output 156.

Data on the other multiplexer inputs may be routed to output 156 as appropriate. Data from idle code generator 162 may be routed through multiplexer 154 when it is desired to transmit idle codes. Clock tolerance compensation sequences (codes) from clock compensation code generator 164 may be inserted into the transmitted data to compensate for mismatches between the clock of integrated circuit 110 and the clock of the integrated circuit to which data is being transmitted over link 14. The clock compensation codes may be discarded at the receiver of the receiving integrated circuit to accommodate the clock mismatch.

Link management circuit 166 may be used to handle the generation of link management instructions (packets) for flow control operations, retry-on-error operations, etc. Multiplexer 154 may be used to send these link management instructions into the data stream when appropriate.

Training sequence generator 168 may be used to generate training sequences that are used during link initialization. Training sequence generator 168 may, for example, generate a first training sequence called TS1 and a second training sequence called TS2, which are used at various stages of the link initialization process. The training sequences TS1 and TS2 include handshaking information that is used to bring up link 14 during link initialization. Other types of training sequence information can be generated by generator 168 if desired.

Lane striping circuitry 170 may be used to distribute the 16×N bits of parallel data on output 156 among the N lanes 16. Encoders 172 (e.g., 8B/10B encoders or other suitable encoders) may be used to convert 8-bit bytes of data into corresponding 10-bit coded words. The coded words supplied at the outputs of the encoders have the same information content as the data provided to their inputs. The additional bits in the coded words ensure that there are a sufficient number of high-to-low and low-to-high transitions in the data to allow successful clock extraction at the receiver. At the receiver, circuitry such as clock-and-data recovery circuitry 128 of FIG. 6 can be used to extract the embedded clock signal from the encoded data.

After passing through encoders 172, the outgoing data may be transmitted across link 14 on respective lanes 16 using the serializer and driver circuitry of high-speed interfaces 142. Typically the data being transmitted over link 14 is high-speed data (e.g., data transmitted at data rates of 100 s of Mbps or Gbps).

Incoming data from the integrated circuit at the other end of link 14 may be received by the input drivers, clock-and-data recovery circuitry, and deserializers of the high-speed interface circuitry 142 in receiver circuitry 116. When there is more than one lane 16 of incoming data, synchronization and deskewing circuitry 174 may be used to synchronize and deskew the incoming data so that it can be successfully merged into a single stream of data suitable for transmission to logic 112 via data buffer 176 and path 178.

Decoders 180 may be used to decode incoming data (e.g., from 10-bit codes to 8-bit data bytes). Lane bonding circuitry 182 may be used to merge multiple lanes of data into a single data path 184. Lane stripping and packet processing circuitry 186 may be used to remove data encapsulation information from the incoming data (e.g., to remove SOP and EOP characters). Stripped data may be provided at output 188.

Data error checking circuitry 190 may be used to check received data for errors (e.g., errors such as cyclic redundancy check (CRC) errors, 8B/10B errors or other decoding errors, etc.). If data error checking circuitry 190 detects an error, a suitable error signal may be generated. For example, an RERR signal may be asserted on RERR port 192 when an error is detected during retry-on-error operations. If a catastrophic error is detected, a catastrophic error signal may be produced by data error checking circuitry 190 and placed on error status port 194. Control circuitry 160 can also generate catastrophic error signals for port 194 when appropriate. Ports such as port 192 and 194 may be monitored by logic 112.

In general, circuits constructed in accordance with the serial communications protocol of the present invention may classify all errors as catastrophic errors, link errors, data errors, or oversized packet errors. A catastrophic error is an unrecoverable error that arises during initialization (i.e., if a lane has the wrong polarity and automatic polarity reversal has not been implemented). A link error results when the link is not able to transmit or receive data, which triggers the initialization process. A data error results in a packet being marked as bad before it is forwarded to logic 112 or a request for retransmission from the remote circuit. Most errors originate from protocol violations at the link layer or bit errors at the physical layer. Physical layer bit errors may involve 8B/10B coding violations and may affect one or multiple lanes. Bit errors at the physical layer may result in link layer protocol errors or cyclic redundancy check (CRC) errors. Severe physical lane errors or bursts of errors may result in multiple coding violations, loss of 8B/10B code alignment, or loss of lane alignment.

The way in which the circuitry of FIG. 6 is implemented depends on which optional serial communications link features the logic designer (user) chose when designing the integrated circuit 110 using tools 62. For example, if the user chose to include the flow control feature, the resulting integrated circuit 110 will have flow control capabilities.

The optional serial communications link features can be implemented using input/output circuitry 146 (e.g., using transmitter circuitry 114, control circuitry 160, and receiver circuitry 116).

As an example, polarity reversal functions may be implemented using a polarity-reversing 8B/10B decoder or as a "soft" polarity reversed 8B/10B decoder constructed from programmable logic. The control circuitry 160 can control such polarity-reversing circuitry using control signals provided over a control path (shown schematically by path 198 in FIG. 6).

As another example, lane order reversal functions may be implemented using lane-order-reversing lane bonding circuitry 182. The lane bonding circuitry 182 may be controlled by control circuitry 160 using control signals provided over a control path such as path 196 of FIG. 6.

Operations such as link initialization, clock tolerance compensation, flow control, and retry-on-error operations are generally two-sided processes. For clarity, these operations are often described herein in the context of a "local" integrated circuit (i.e., a first integrated circuit sometimes labeled "integrated circuit A" or "IC1") that communicates over link 14 with a "remote" integrated circuit (i.e., a second integrated circuit sometimes labeled "integrated circuit B" or "IC2"). The local integrated circuit's transmitting circuitry is often transmitting information to the receiving circuitry of the remote circuit while the transmitting circuitry of the remote circuit is transmitting information to the receiving circuitry of the local circuit. To operate a bidirectional serial link 14 between the local and remote circuits, both the local and remote circuits must transmit and receive signals.

Figure 7:
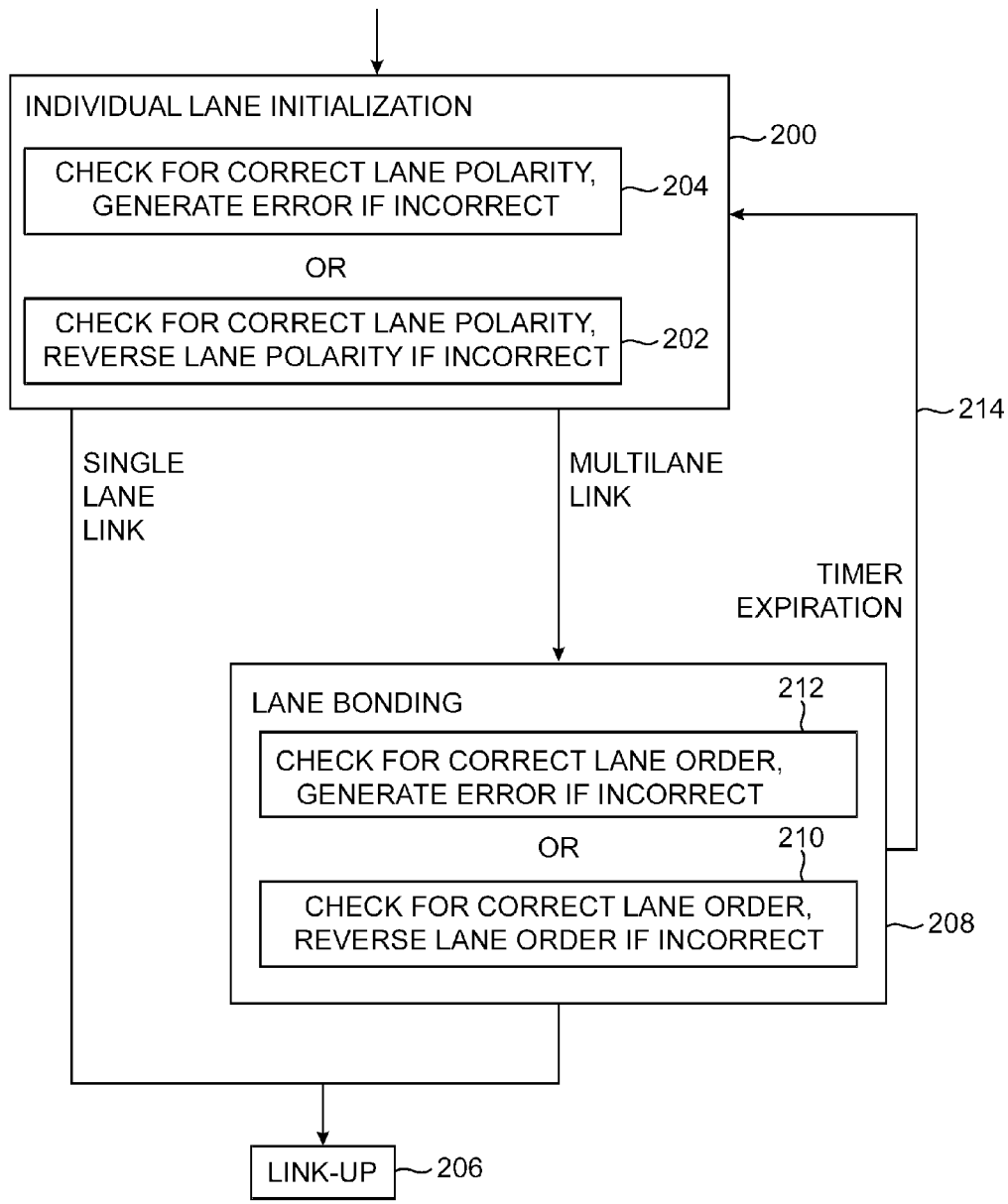
FIG. 7 is a flow chart of illustrative steps involved in initializing a serial communications link in accordance with the present invention.

A link initialization process that may be used to initialize serial communications links that communicate using the serial communications protocol of the present invention is shown in FIG. 7. The link initialization process may be initiated by a power-on reset, a hardware reset, a link error, or other suitable criteria. A power-on reset condition may occur during a boot-up operation. A hardware reset may follow the press of a button to initiate a hard boot. Link errors may be detected during error checking procedures (e.g., when deskewing and aligning lanes, etc.).

The link initialization procedure of FIG. 7 may be used for single-lane serial links and for serial links having multiple lanes.

If a single lane link is being initialized, lane initialization is performed at step 200. If the integrated circuit 110 that is performing the lane initialization includes lane initialization circuitry 111 (FIG. 5) for implementing automatic lane polarity reversal, the lane may be checked for correct polarity at step 202 and, if an incorrect lane polarity is detected, it may be automatically reversed. If the integrated circuit that is performing the lane initialization does not include circuitry 111 that is capable of automatically reversing an incorrect lane polarity, the circuitry 111 may be used to check for an incorrect lane polarity and may be used to generate an error signal if the lane polarity is incorrect (step 204).

Following successful initialization of the lane, the link set-up process is finalized at step 202 (i.e., by waiting for the remote integrated circuit to finish its link initialization process and declare initialization complete).

If a multilane link is being initialized, each individual lane is first initialized at step 200. After each lane has been successfully initialized at step 200, the initialized lanes are combined to form a multilane link (lane bonding step 208) and the link set-up process is finalized at step 206.

If the automatic lane-order reversal feature has been implemented, the control circuitry 160 will automatically reverse the order of the lanes whenever a reversed lane order condition is detected (step 210). 10a. If the automatic lane-order reversal feature has not been implemented, the control circuitry will generate an error signal whenever it is determined that the lanes are not in the correct order (step 212). If the lanes 16 cannot be successfully bonded into a link 14 before a time expires, the circuit returns to step 200 for individual lane initialization, as shown by path 214.

Serial communications circuitry constructed in accordance with the serial communications protocol of the present invention may insert idle characters into gaps in the transmitted data. The idle code feature is preferably mandatory (not optional).

Figure 8A:
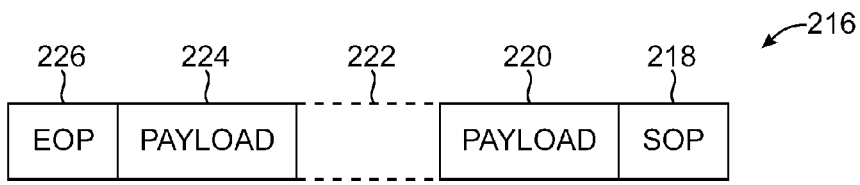
FIG. 8a is a diagram showing how a packet of data to be transmitted over a serial communications link in accordance with the present invention may contain a gap.

A diagram showing data that is to be transmitted before idle code insertion is presented in FIG. 8a. As shown in FIG. 8a, the data 216 that is to be transmitted may be encapsulated in packets (e.g., using data encapsulation circuit 152 (FIG. 6)). The start of each packet may be marked using a start-of-packet (SOP) tag 218. The end of each packet may be marked using an end-of-packet (EOP) tag 226.

In the example of FIG. 8a, the data to be transmitted in the packet (payload 220 and payload 224) has a gap 222. If gaps such as gap 222 were permitted to remain in the transmitted data, there would be potentially large periods of time during which no signals would be transmitted across link 14. This would disrupt the link, because the phase-locked-loop or delay-locked loop circuitry in the clock-and-date recovery circuit of the receiver would lose frequency lock on the data.

Figure 8B:
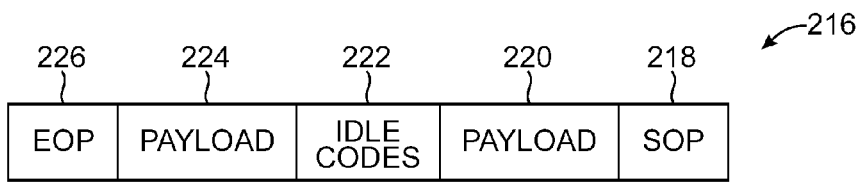
FIG. 8b is a diagram showing how idle codes may be inserted into the gap of FIG. 8a prior to data transmission over a serial communications link in accordance with the present invention.

As a result, control circuitry 160 preferably uses idle code generator 162 and data path multiplexer 154 (FIG. 6) to insert idle codes into gap 222, as shown in FIG. 8b. The idle codes serve as a type of "dummy data" that keeps the link 14 active even when no actual data needs to be transmitted. Once the idle codes have been inserted into the data 216, the data 216 may be transmitted across link 14.

Figure 9A:
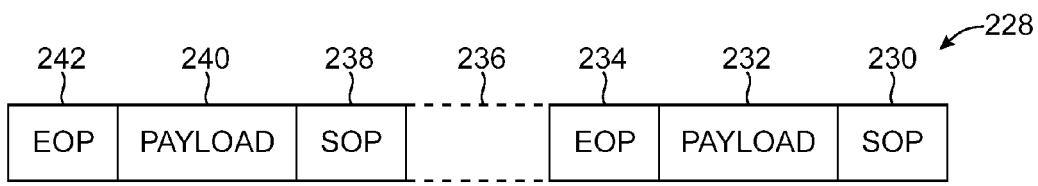
FIG. 9a is a diagram showing how data to be transmitted over a serial communications link in accordance with the present invention may contain a gap between data packets in accordance with the present invention.

Sometimes gaps in the data to be transmitted arise between packets. This situation is shown by data 228 in FIG. 9a. As shown in FIG. 9a, payload data 232 is encapsulated in a first packet whose beginning and end are marked using tags 230 and 234. Payload data 240 is encapsulated in a second packet whose beginning and end are marked using tags 238 and 242. There is a gap 236 between the end of the first packet (EOP label 234) and the beginning of the second packet (SOP label 238).

Figure 9B:
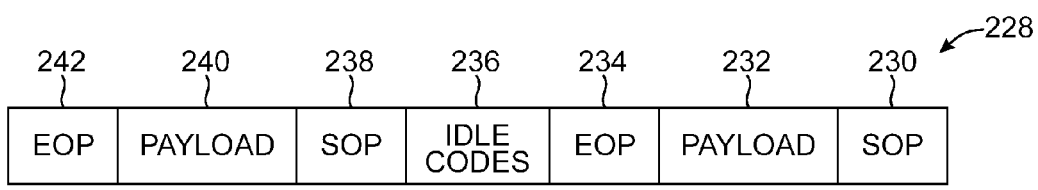
FIG. 9b is a diagram showing how idle codes may be inserted into a gap between data packets of the type shown in FIG. 9a prior to data transmission over a serial communications link in accordance with the present invention.

As shown in FIG. 9b, input-output circuitry 146 fills the gap 236 with idle codes before the data is transmitted across link 14, thereby ensuring proper operation of the link even though there is no data that needs to be conveyed during gap 236.

Figure 10:
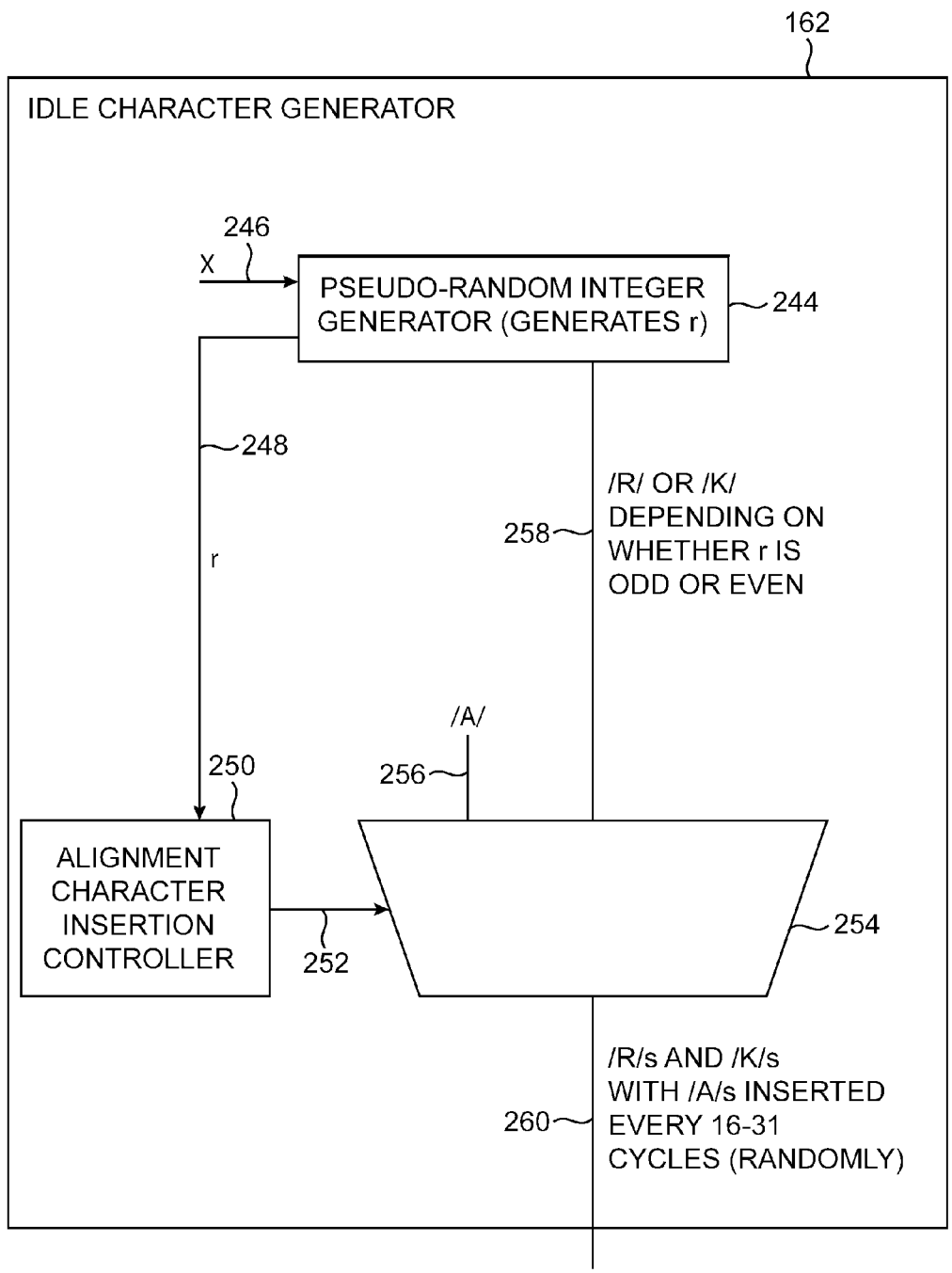
FIG. 10 is a diagram of an idle sequence generator that may be used to generate idle sequence codes in accordance with the present invention.

Idle codes for filling gaps such as gaps 222 and 236 may be generated using idle code generator circuitry such as idle code generator 162 of FIG. 6. An illustrative implementation of idle code generator 162 is shown in FIG. 10. This arrangement is merely illustrative. Idle codes may be generated using any suitable arrangement if desired.

As shown in FIG. 10, idle code generator 162 may have a pseudo-random integer generator 244, an alignment character insertion controller 250, and a multiplexer 254.

Pseudo-random integer generator 244 may randomize an input x such as a non-random value derived from a clock to produce a pseudo-random integer r. The integer r may be calculated using a polynomial (e.g., $x^7+x^6+1$) or any other suitable random number generation algorithm.

The pseudo-random integer generator 244 generates characters /R/ and /K/ at its output 258, depending on whether r is odd (/R/) or even (/K/). These characters are provided to one of the two inputs to multiplexer 254. The other input of multiplexer 254 receives alignment characters /A/ via path 256 from a suitable source.

Alignment character insertion controller 250 receives a random number input via path 248. The random number may be provided from any suitable source. In the present example, the random number presented to the alignment character insertion controller 250 via path 248 is the same random integer r produced by pseudo-random integer generator 244. This is, however, merely illustrative.

Most of the time, the alignment counter insertion controller 250 produces control signals on path 252 that direct the multiplexer 254 to route the /R/ and /K/ characters from path 258 to the multiplexer output 260, thereby creating a stream of idle characters made up of /R/s and /K/s for insertion into the data path to fill data gaps. However, the alignment character insertion controller 250 also uses random number input 248 to direct multiplexer 254 to connect its input 256 to its output 260 randomly, every 16-31 clock cycles. The resulting idle characters at output 260 of idle character generator 162 contain /R/ and /K/ characters with /A/s inserted randomly every 16-31 cycles. This sequence of idle characters may be used to fill gaps (e.g., by merging these characters into the data path using data path multiplexer 154 of FIG. 6). The randomness of the /R/s, /K/s, and the /A/s reduces electromagnetic interference (EMI) (i.e., radiated noise) on the lines in link 14. When the idle characters are received at the remote end of the link 14, they may be discarded (ignored). The /A/s are used by the deskewing circuitry in the remote receiver to align lanes 16.

Figure 11:
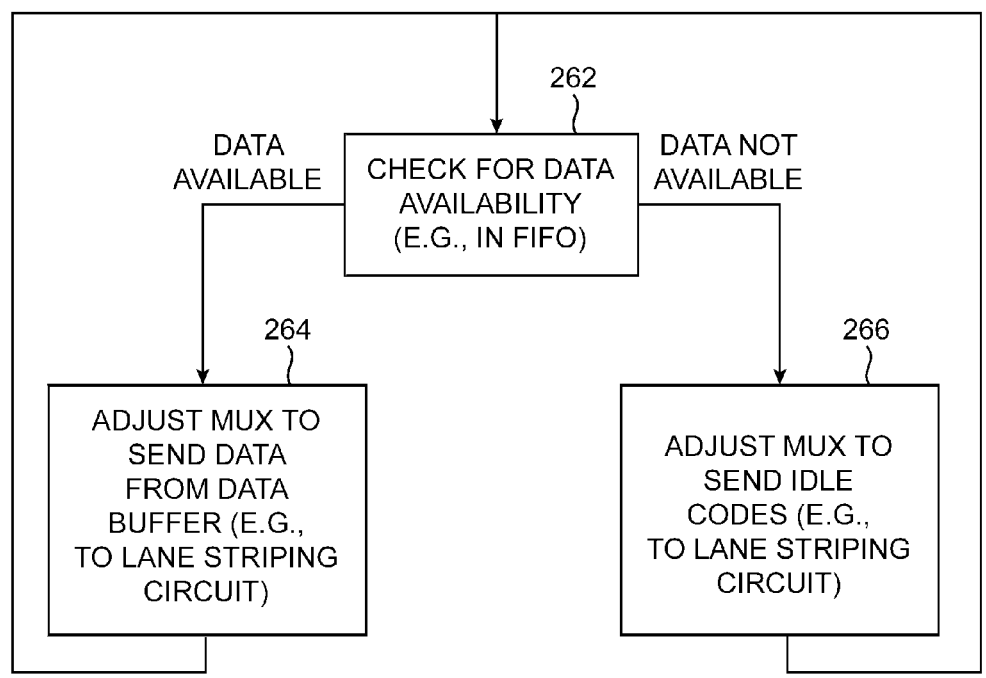
FIG. 11 is a flow chart of illustrative steps involved in inserting idle codes into data being transmitted over a serial communications link in accordance with the present invention.

A flow chart of illustrative steps involved in filling gaps in the data to be transmitted with idle characters is shown in FIG. 11. At step 262, the control circuitry 160 checks whether data is available for transmission from logic 112. With one suitable arrangement, logic 112 periodically places data to be transmitted into data buffer 144 (e.g., in a FIFO). When the FIFO is empty (i.e., when there is a gap in the data to be transmitted), the FIFO_EMPTY signal on line 150 is asserted. Control circuitry 160 may monitor the status of the FIFO_EMPTY signal.

When the FIFO_EMPTY signal has not been asserted, the control circuitry 160 knows that there is data available to be sent. Accordingly, at step 264, the control circuitry 160 can provide control signals to data path multiplexer 154 via path 158 that direct data path multiplexer 154 to route signals from the data encapsulation circuit 152 to its output 156, thereby allowing data from data buffer 144 to be transmitted over link 14.

When the FIFO_EMPTY signal has been asserted, the control circuitry 160 knows that there is a gap in the data (i.e., data is not available to be transmitted over the link). At step 266, the control circuitry 160 can therefore provide control signals to data path multiplexer 154 via path 158 that direct data path multiplexer 154 to route the idle codes from idle character generator 162 to its output 156, thereby filling the gap with the idle sequence. At the receiver, the receiving circuitry can detect the idle characters and can discard them to extract the clock signal that was sent.

The use of idle characters helps ensure that data gaps do not affect the integrity of the link. The use of idle characters is preferably mandatory in integrated circuits that are compliant with the serial communications protocol of the present invention. Other features are optional.

For example, the inclusion of clock tolerance compensation circuitry in integrated circuit 110 is optional. Circuits can be designed using tools 62 of FIG. 4 that either include or do not include circuitry for compensating for mismatches between local and remote clocks. Both types of circuits will still be compliant with the serial communications protocol of the present invention and will be able to communicate under the proper circumstances.

Clock tolerance compensation circuitry is generally needed when a local integrated circuit and remote integrated circuit do not share a common clock, but can be omitted to save resources when a common clock is available. Two situations in which clock tolerance compensation circuitry can be omitted are shown in FIGS. 12a and 12b.

Figure 12A:
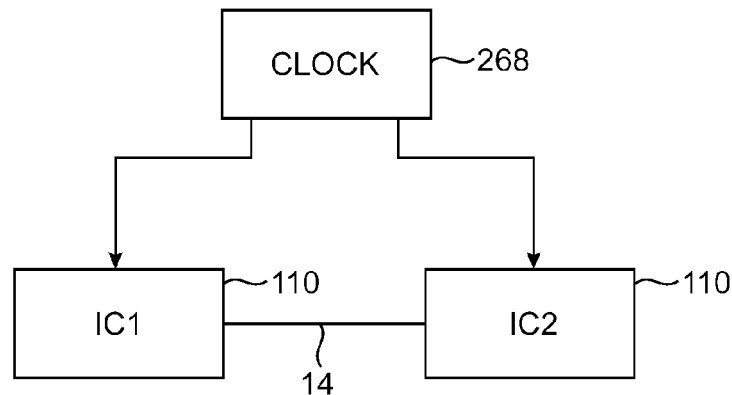
FIG. 12a is a diagram showing how two integrated circuits that communicate over a serial communications link in accordance with the present invention may be operated with a common clock.

As shown in FIG. 12a, in some environments both the local integrated circuit (IC1) and the remote integrated circuit (IC2) are driven by a common clock 268. Because each integrated circuit is clocked using exactly the same clock signals, there is no clock signal mismatch and clock tolerance compensation is not required. Accordingly, the integrated circuits 110 in FIG. 12a need not use the optional clock tolerance compensation feature.

Figure 12B:
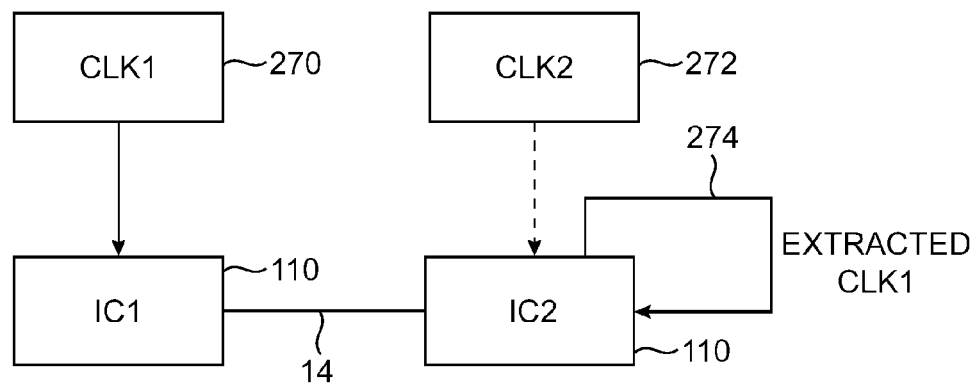
FIG. 12b is a diagram showing how first and second integrated circuits that communicate over a serial communications link may use an embedded clock arrangement in accordance with the present invention.

As shown in FIG. 12b, a similar situation arises when the remote integrated circuit operates off of the clock of the local integrated circuit by extracting the clock from the data. In the example of FIG. 12b, clock 270 is used to provide a clock signal CLK1 for IC1. Encoding circuitry on IC1 embeds the clock signal CLK1 into the data being transmitted over link 14 from IC1 to IC2. The receiver circuitry at IC2 has a clock-and-data recovery circuit that extracts the embedded clock CLK1 from the data, as shown by line 274. The extracted CLK1 signal is used as the clock for operating the circuitry of IC2. Because the same CLK1 clock signal is used by both IC1 and IC2, there is no clock mismatch and no clock tolerance compensation circuitry is required. Although a clock signal CLK2 (which is generally nominally equal to CLK1) is provided to IC2 by a clock 272 that is located at IC2 and that is separate from clock 270, the clock signal CLK2 is only used as a reference for the clock-and-data recovery circuit. Once the clock-and-data recovery circuit in IC2 is able to capture the embedded clock from the data stream, the signal CLK2 is not needed to clock the data circuitry on IC2.

Figure 13:
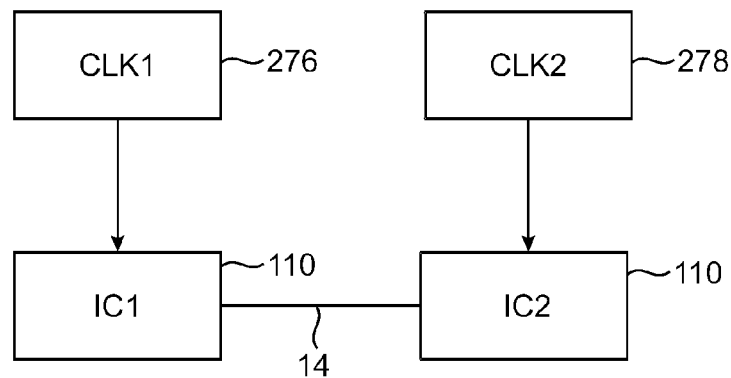
FIG. 13 is a diagram showing how first and second integrated circuits with independent clocks may communicate over a serial communications link in accordance with the present invention.

In circuit environments such as those shown in FIGS. 12a and 12b, the optional clock tolerance compensation feature is not needed, because the clock rates at the local and remote ends of link 14 match exactly. However, in situations in which different clock sources are used at either end of the link, the clock rates will not match exactly, even if their clock rates are nominally identical. This type of situation is shown in FIG. 13. As shown in FIG. 13, the local integrated circuit 110 (IC1) is clocked using a clock signal CLK1 provided by clock 276. At the other end of link 14, a clock 278 is used to drive IC2 at a clock rate CLK2. Nominally the clock rates are identical (i.e., CLK1=CLK2). In practice, however, there is always a slight mismatch between independent clocks.

To accommodate clock mismatch, clock compensation codes (characters) are inserted in the outgoing data at the transmitter. These codes are discarded at the receiver. In the presence of a clock mismatch, the local clock CLK1 may be slower than the remote clock CLK2 or the local clock CLK1 may be faster than the remote clock CLK2. When the remote clock is slower than the local clock, the reception and discarding of the clock compensation codes prevents data from being lost. If the clock compensation codes are not inserted, the unbalanced state of the clocks due to the presence of the faster transmitter may cause the transmitted data to overwhelm the receiver.

Figure 14A:
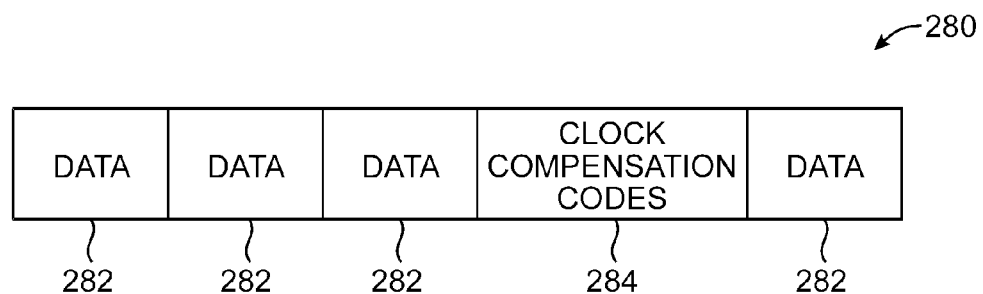
FIG. 14a is a diagram showing how clock compensation codes may be inserted into data being transmitted from a local integrated circuit to a remote integrated circuit when an optional clock tolerance compensation feature has been implemented in a given integrated circuit in accordance with the present invention.
Figure 14B:
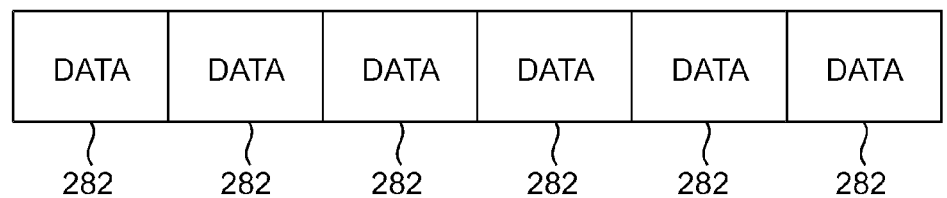
FIG. 14b is a diagram showing how data may be transmitted without clock tolerance compensation codes when the optional clock tolerance compensation feature is not implemented in a given integrated circuit in accordance with the present invention.

The diagram of FIG. 14a shows how clock compensation codes 284 can be inserted within data 282 in outgoing data signal 280 when the optional clock tolerance compensation feature is implemented in a given circuit. The diagram of FIG. 14b shows how outgoing data signal 286 is transmitted without inserting clock compensation codes within data 282 in an integrated circuit in which the optional clock tolerance compensation feature has not been implemented.

Figure 15:
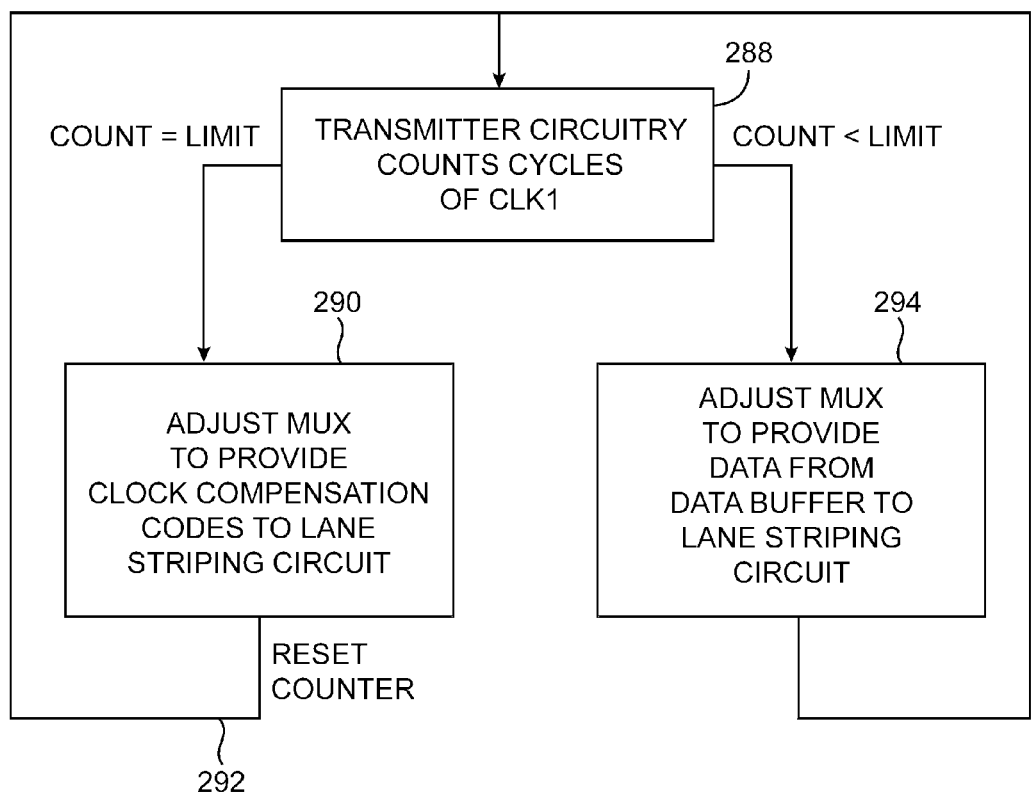
FIG. 15 is a flow chart of illustrative steps involved in using a clock tolerance compensation arrangement to handle a mismatch between local and remote clocks in accordance with the present invention.

Illustrative steps involved in using clock tolerance compensation codes are shown in FIG. 15. At step 288, the transmitter circuitry 114 and control circuitry 160 or other suitable input/output circuitry 146 on circuit 110 count the number of cycles of clock CLK1. A user can use computer-aided design tools 62 of FIG. 4 or other suitable equipment (e.g., programmer 54 of FIG. 3) to specify a desired LIMIT value. The value of the variable LIMIT is related to the amount of expected mismatch between clocks CLK1 and CLK2 (e.g., based on the known tolerance of the clock generating devices to be used in the system). For example, if the mismatch is 100 parts per million, the value of LIMIT may be set to 5000 cycles.

Two 10-bit clock compensation codes (a /K/ and /R/) are inserted on each lane 16 simultaneously, once every LIMIT cycles—i.e., once each 5000 cycles if LIMIT equals 5000.

As shown in FIG. 15, so long as the value of counted clock cycles COUNT is less than the value of LIMIT, the control circuitry 160 directs data path multiplexer 154 to route the data from the data buffer 144 and data encapsulation circuit 152 to output 156 (step 294). In this configuration, the data from logic 112 is transmitted across link 14.

However, when the counted value of clock cycles COUNT is equal to the value of the LIMIT variable, the control circuitry 160 directs data path multiplexer 154 to connect the output of clock compensation code generator 164 (FIG. 6) to the output 156 (step 290). Clock compensation code generator 164 generates clock compensation codes (i.e., the /K/ and /R/ characters), which can be recognized at the other end of the link 14 as not being part of the data that is being transmitted. By connecting the output of generator 164 to the output 156, the clock compensation codes are inserted into the data path. The data being transmitted from the transmitter circuitry 114 therefore appears as shown in FIG. 14a, where clock compensation codes have been inserted between data blocks 282. The insertion of the clock compensation characters compensates for the mismatch between the local and remote clocks by providing "dummy" data at the local circuit that can be discarded by the remote circuit. This prevents the local circuit from overwhelming the remote circuit in situations in which the remote clock is slower than the local clock. After the clock compensation characters have been inserted, the counter COUNT is reset, and the process returns to step 288, as indicated by line 292.

If the optional clock tolerance compensation feature has not been implemented on a given integrated circuit, the control circuitry 160 never inserts clock tolerance compensation characters from clock compensation code generator 164 into the data path and generator 164 may be omitted. The outgoing data in this situation appears as shown in FIG. 14b.

The optional clock tolerance compensation feature of the serial communication protocol allows compliant integrated circuits to be used in both synchronous and asynchronous modes. When used in synchronous mode, no clock tolerance compensation is required, which saves circuit resources.

The serial communications protocol in accordance with the present invention may also have an optional flow control feature. Flow control may be used to provide a type of data transmission feedback from the receiving integrated circuit to the transmitting circuit. When flow control is implemented, the transmitting circuit monitors flow control signals provided from the receiving integrated circuit. The transmitting circuit can temporarily stop sending data to the receiving integrated circuit when the receiving integrated circuit indicates that it has reached its capacity for receiving data. Flow control arrangements help to prevent data overflow conditions, although implementing flow control requires circuit resources.

Figure 16A:
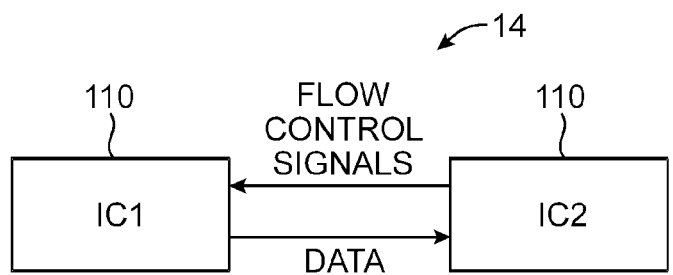
FIG. 16a is a diagram showing how flow control signals may be used to provide feedback to control the transmission of data when transmitting data from a local integrated circuit to a remote integrated circuit using a serial communications link in accordance with the present invention.
Figure 16B:
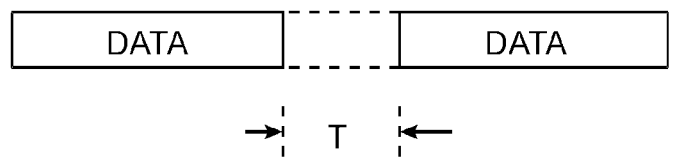
FIG. 16b is a data diagram showing how a received flow control signal may result in a pause in transmitted data in accordance with the present invention.

An illustrative system environment in which flow control is being used is shown in FIG. 16a. In the arrangement of FIG. 16a, local integrated circuit IC1 is transmitting data to remote integrated circuit IC2 over serial communications link 14. Receiving circuit IC2 can send flow control signals back to IC2 over a return path in link 14. For example, whenever IC2 is receiving too much data, IC2 may issue flow control commands that direct IC1 to temporarily stop transmitting data. This creates a pause in the data for a time T, as shown in FIG. 16b. (The pause may be filled with idle codes, which are not shown in FIG. 16b.)

Figure 17A:
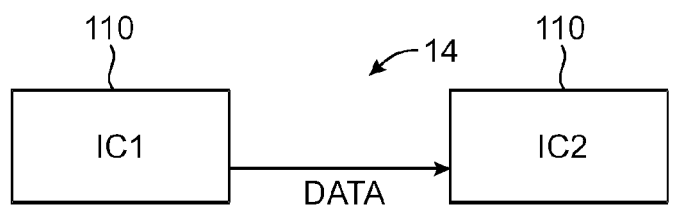
FIG. 17a is a diagram showing how data may be sent from a local integrated circuit to a remote integrated circuit that does not use flow control while still being compliant with a serial communications protocol in accordance with the present invention.
Figure 17B:
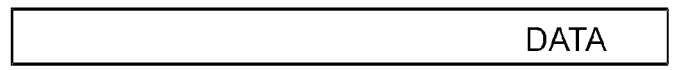
FIG. 17b is a data diagram showing how the data transmitted from the local integrated circuit (IC1) to the remote integrated circuit (IC2) in FIG. 17a is not paused as shown in FIG. 16b in accordance with the present invention.

When it is desired to conserve circuit resources, a user may decide not to implement flow control in a circuit. An illustrative system environment in which the integrated circuits 110 do not have flow control capabilities is shown in FIG. 17a. As shown in FIG. 17a, data may be transmitted from IC1 to IC2 over link 14 to produce a continuous stream of data (FIG. 17b). There are no flow control signals sent from IC2 to IC2 and the data is transmitted across link 14 without regard to the capacity of IC2 to absorb the transmitted data.

Figure 18:
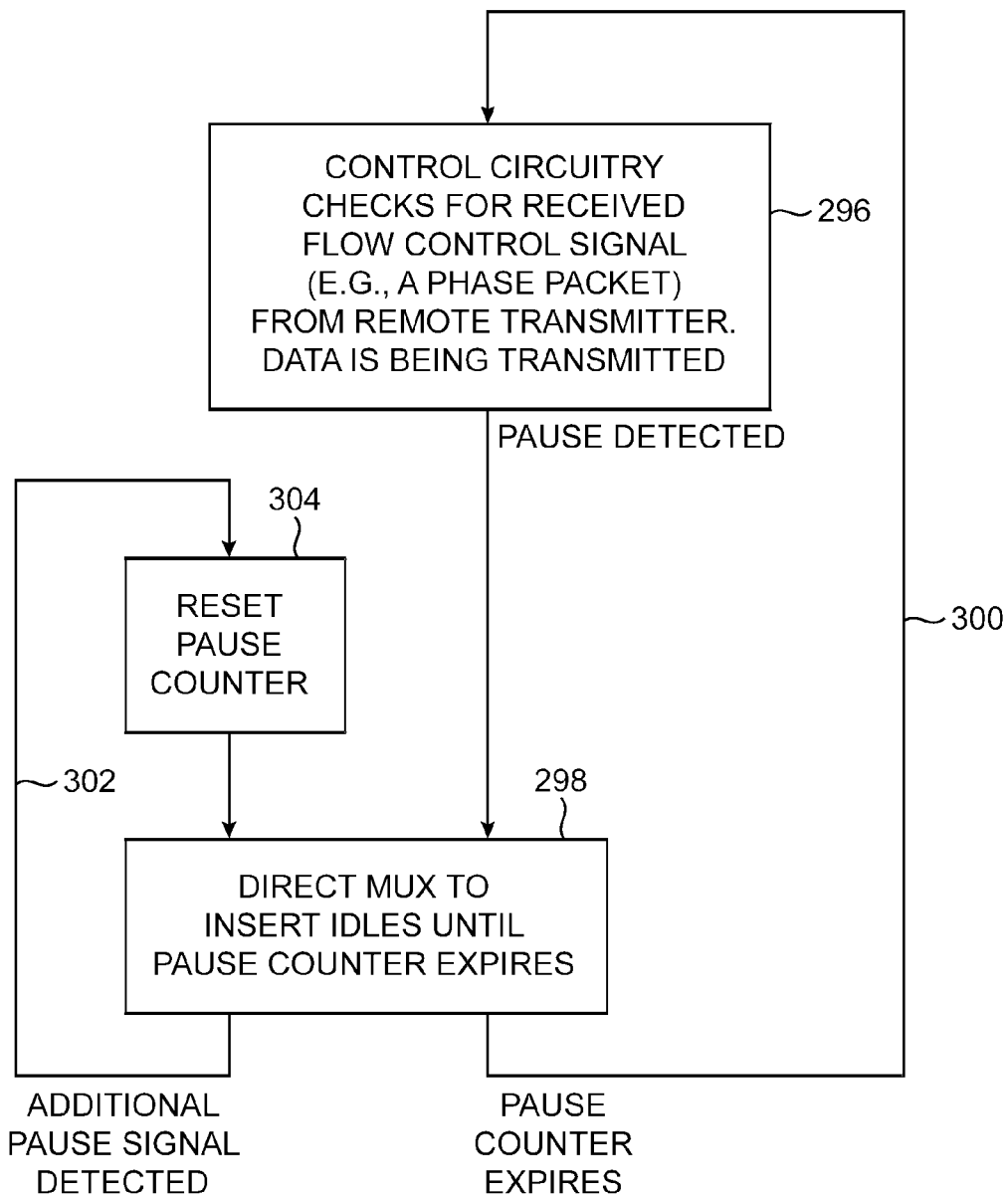
FIG. 18 is a flow chart of illustrative steps performed by transmitter circuitry in an environment in which a flow control arrangement has been implemented that is compliant with a serial communications protocol in accordance with the present invention.

Illustrative steps involved in transmitting data from an integrated circuit in which the flow control feature has been implemented are shown in FIG. 18. The flow chart of FIG. 18 shows activities at the local integrated circuit. During step 296, the local integrated circuit is transmitting data to the remote integrated circuit while the control circuitry 160 in the local integrated circuit awaits (and may be receiving) flow control signals from the remote integrated circuit over a return path in link 14. If a pause packet or other suitable flow control signal is received from the remote transmitter, the control circuitry 160 may direct the data path multiplexer 154 to insert idle characters from idle code generator 162 into the data path at step 298. The idle characters form a pause in the data in which no actual data is being sent. During step 298, a pause counter is continuously incremented.

As indicated by line 300, if the pause counter expires, the process returns to step 296. Data is transmitted while the local integrated circuit awaits another pause signal. So long as no pause signal is received, data is transmitted uninterrupted by idle characters.

As indicated by line 302, if an additional pause signal is received in the middle of step 298 (while idle characters are being inserted into the data), the pause counter can be reset (step 304). This gives the remote integrated circuit more time to accept the transmitted data.

Figure 19:
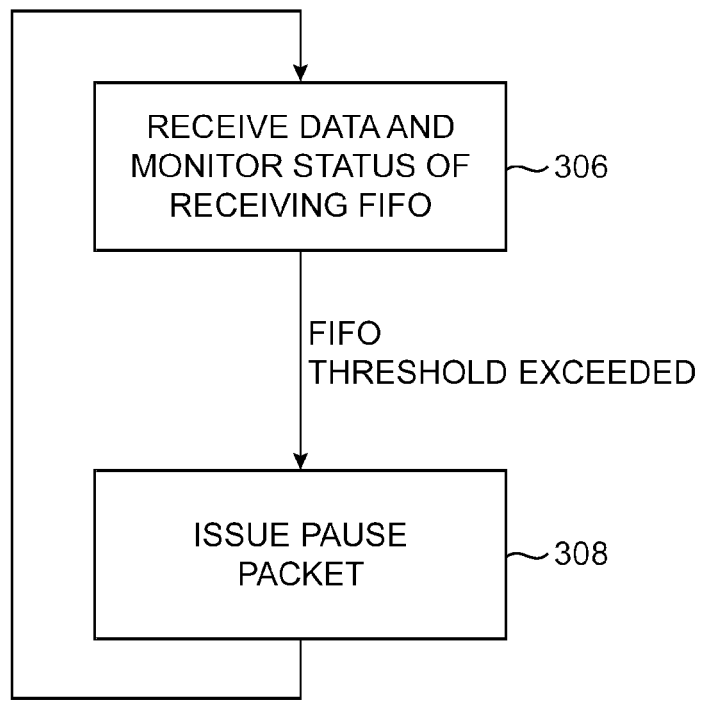
FIG. 19 is a flow chart of illustrative steps performed by receiver circuitry in an environment in which a flow control arrangement has been implemented that is compliant with a serial communication protocol in accordance with the present invention.

At the same time that the local integrated circuit is performing the steps of FIG. 18, the remote integrated circuit is performing the steps of FIG. 19. In particular, the control circuitry 160 of the remote integrated circuit is using its receiver circuitry 116 to receive the data being transmitted by the local integrated circuit. The received data is placed in data buffer 176 on the remote circuit. Data buffer 176 may contain a FIFO that generates a signal when it contains more than a threshold amount of data. When this threshold has been exceeded, the remote integrated circuit knows that it is nearing its capacity to successfully receive data. Accordingly, when the FIFO threshold is exceeded, the remote integrated circuit can use its transmitting circuitry to send a pause packet to the local integrated circuit (step 308). The pause packet may, for example, be generated by a link management circuit 166 on the remote integrated circuit.

Figure 20:
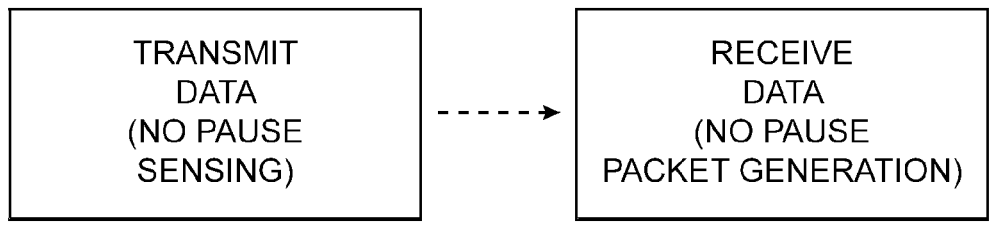
FIG. 20 is a diagram showing how integrated circuits that are compliant with a serial communications protocol in accordance with the present invention can communicate over a serial communications link without flow control.

The process of sending and receiving data when the optional flow control feature has not been implemented is shown in FIG. 20. With no flow control capabilities in place, the transmitting local integrated circuit sends data without sensing whether any pause signals have been received while the receiving remote integrated circuit receives data without generating pause signals.

In the illustrative flow control arrangement described in connection with FIGS. 17-20, flow control operations can be controlled using pause signals that direct the transmitter to temporarily pause in the transmission of data. Other types of flow control arrangements may also be used if desired. For example, an XON/XOFF flow control scheme can be used in which the control logic for handling flow control operations is redistributed between the local and remote circuits. With this type of arrangement, the remote integrated circuit may send an XON flow control signal when data is desired and may assert an XOFF signal when it is desired to pause the transmission of data. The transmitter in the local integrated circuit may respond accordingly.

Another optional serial communications link feature in the serial communications protocol relates to so-called retry-on-error operations. With a retry-on-error scheme, the remote integrated circuit actively acknowledges successfully received data (packets). The local integrated circuit retains transmitted data temporarily in a circular buffer. If the transmitted data is not received properly, it can be retransmitted. The retry-on-error feature, when implemented, therefore helps to ensure successful transmission of data between the local and remote integrated circuits.

Figure 21:
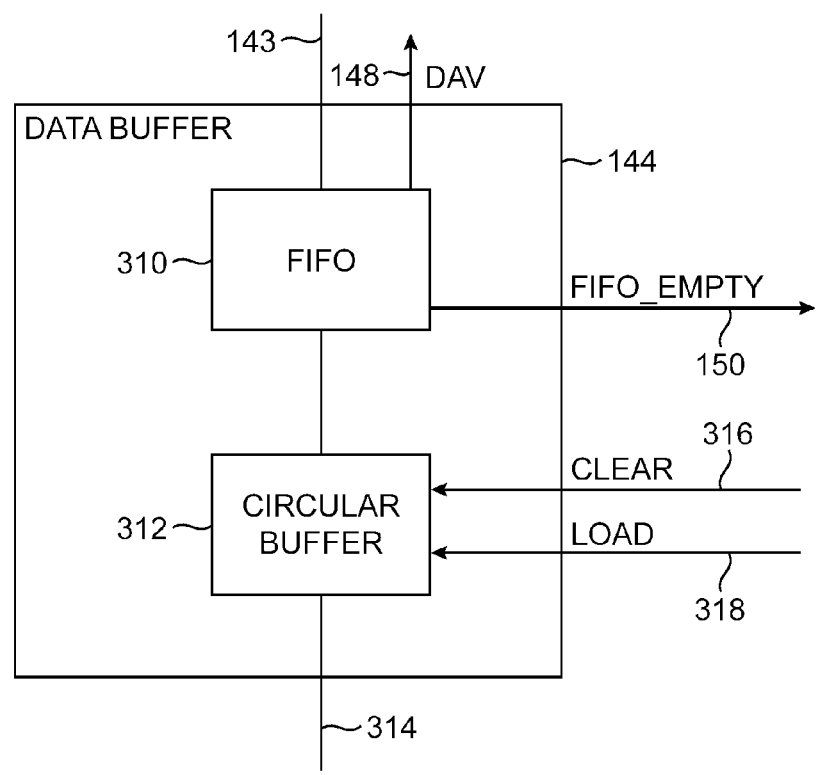
FIG. 21 is a diagram of an illustrative data buffer constructed in accordance with the present invention.

An illustrative data buffer 144 that may be used by a local integrated circuit 110 in which the retry-on-error feature has been implemented is shown in FIG. 21. Data buffer 144 may contain a FIFO 310 and a circular buffer 312. When the FIFO contains more than a threshold amount of data, the DAV signal on line 148 may be deasserted. The signal FIFO_EMPTY on line 158 may be asserted when the FIFO 310 is empty. FIFO 310 provides an interface between the data received from logic 112 on path 143 and the outgoing data for the data encapsulation circuit 152 that is provided on path 314.

Circular buffer 312 may be loaded from FIFO 310 in accordance with loading control signals received at input 318. The buffer 312 contains a number of discrete cells (or discrete packet buffers). If a packet buffer is available, new data is written into that location from FIFO 310. The cells are filled and emptied in order. The buffer is considered to be "circular," because once the end of the buffer has been reached, the usage of the buffer wraps around and starts at the beginning.

Once a packet buffer has been filled, data in that buffer is available to be transmitted to the remote integrated circuit and retransmitted to the remote integrated circuit in the event of a transmission error. Once data from a packet buffer has been successfully transmitted and acknowledged that packet buffer is cleared using one of clear inputs 316 and is made available for a new packet.

Figure 22:
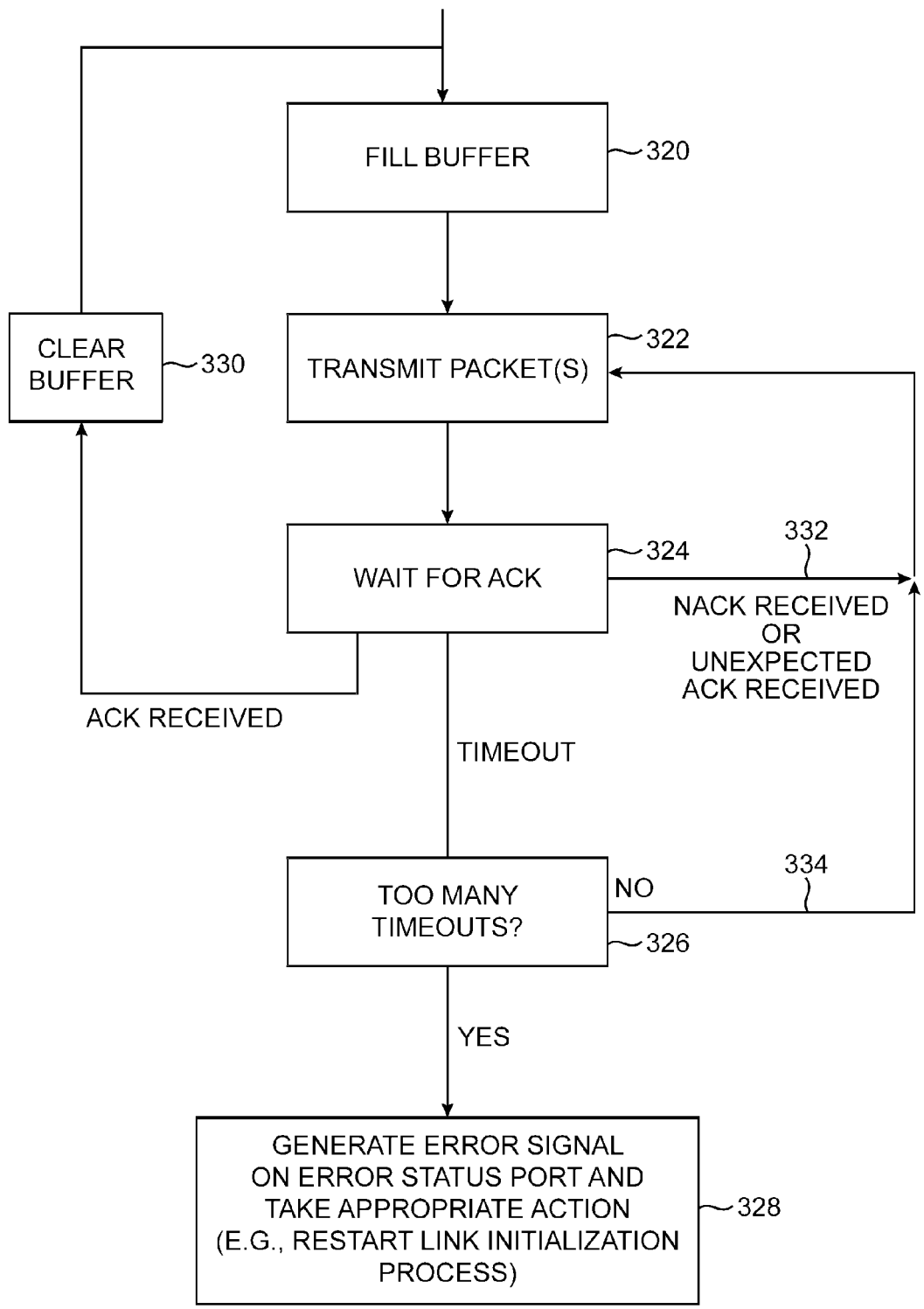
FIG. 22 is a flow chart of illustrative transmitter steps involved in a retry-on-error process in accordance with the present invention.

Illustrative steps involved in transmitting data using transmitter circuitry 114 in an integrated circuit 110 in which the optional retry-on-error feature has been implemented are shown in FIG. 22. Initially, data from the logic 112 (FIG. 6) is received into the FIFO 310 of data buffer 144 (FIG. 21). At step 320, data from FIFO 310 is used to fill an appropriate packet buffer in circular buffer 312 (FIG. 21). After the packet buffer has been filled, the data from the packet buffer is encapsulated as a packet by data encapsulation circuit 152 and is transmitted to the remote receiver over link 14 through the data path multiplexer 154 and the remainder of the transmitter circuitry 114. Control circuitry 160 controls the operation of the process.

The transmitted packet will generally be received by the receiver, but in noisy conditions, some packets may be lost or corrupted. With the retry-on-error arrangement, packets that are not successfully received can be retransmitted from the circular buffer 312. Since data is not discarded from the circular buffer until it has been successfully received by the receiver, the retry-on-error scheme helps to avoid problems due to lost packets.

After a packet has been transmitted at step 322, the local integrated circuit uses its receiver circuitry 116 and control circuit 160 to await an acknowledgment signal ACK from the remote integrated circuit (step 324). If the remote integrated circuit successfully receives the transmitted packet, the remote circuit will issue the ACK signal. When the ACK signal is received by the local circuit, buffer 312 is cleared (step 330) and the circuit returns to step 320 to refill the circular buffer with new data.

The remote circuit can issue a negative acknowledge (NACK) signal whenever a packet is not received properly. If a NACK is received from the remote circuit or if an ACK is received when not expected (i.e., an ACK is received for an out-of-order packet), the control circuitry 160 can conclude that there has been a data transmission error. Accordingly, as indicated by line 332, the process can loop back to transmit packet step 322, where the packet or packets can be retransmitted across link 14. Successful transmission will be followed by reception of an ACK signal at step 324.

If too much time elapses during step 324 without reception of an ACK signal or a NACK (i.e., if a timeout condition occurs), the process proceeds to step 326. At step 326 it is determined whether there have already been too many timeouts. If there have not been too many timeouts, the process follows path 334 and attempts again to transmit the packet (step 322). If there have been too many timeouts, this is indicative of a serious problem with the link 14, and the control circuitry 160 can generate an error signal at step 328. In particular, the control circuitry 160 can generate an error signal on error status port 194 and can take additional appropriate actions such as restarting the link initialization process.

Figure 23:
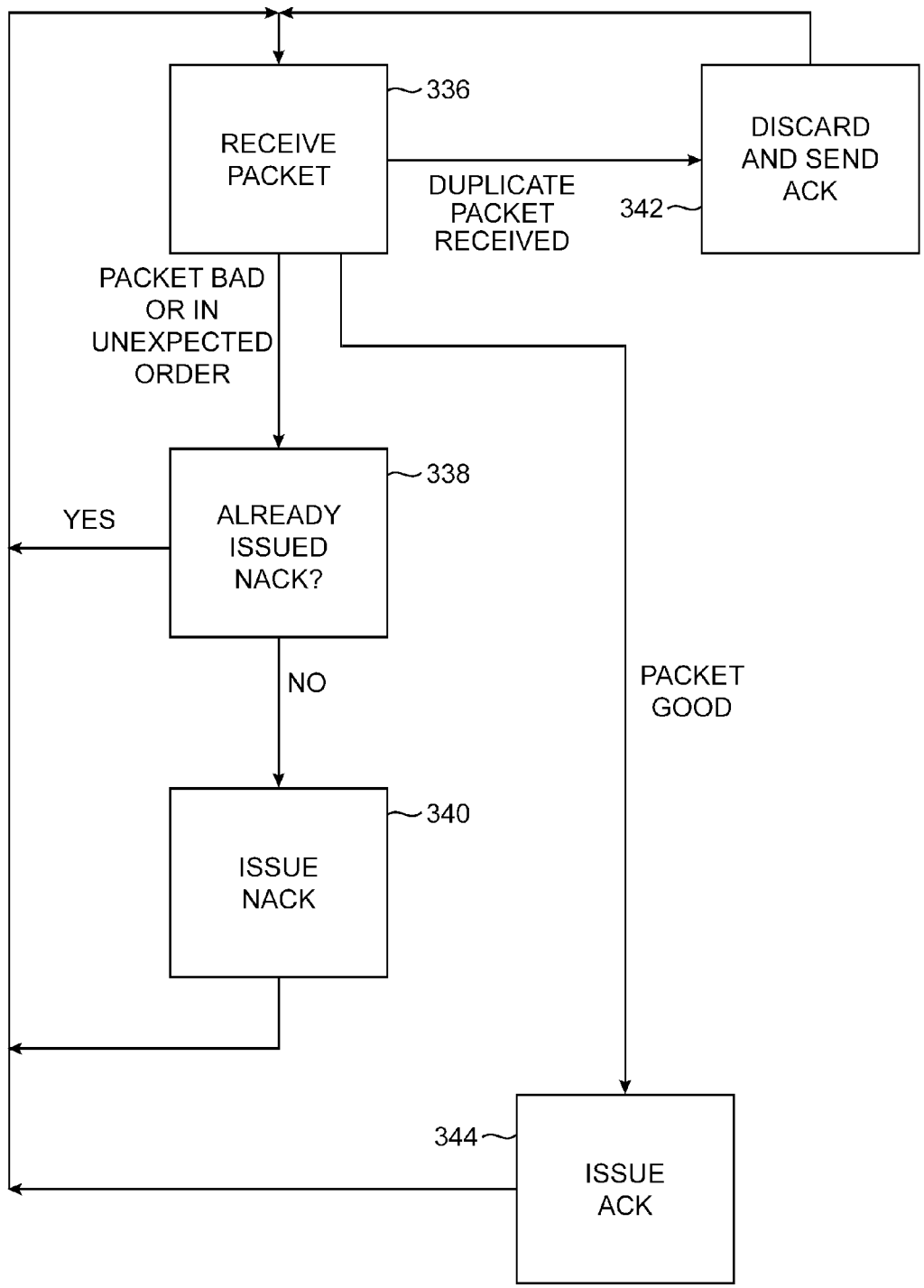
FIG. 23 is a flow chart of illustrative receiver steps involved in a retry-on-error process in accordance with the present invention.

While the local integrated circuit is performing the retry-on-error operations of FIG. 22, the remote circuit with which the local circuit is communicating over link 14 is performing the retry-on-error operations of FIG. 23.

At step 336, the receiver circuitry 116 and control circuitry 160 of the remote circuit receive a packet that has been transmitted from the local circuit over link 14. If a good packet is received, the remote circuit sends an ACK signal back to the local circuit over link 14 (step 344). Packets are labeled with packet numbers at the local circuit. This allows the remote circuit to check packets to determine whether they have arrived in the proper order. If a bad packet is received or if a packet is received that is in an unexpected order, the circuit proceeds to step 338. At step 338, it is determined whether or not a NACK for the bad or mis-ordered packet has already been sent to the local circuit. If a NACK has not already been sent, the remote circuit can send a NACK at step 340 before returning to step 336. If a NACK has already been issued, the remote circuit can return directly to step 336.

If a duplicate packet is received at step 336, the remote circuit can discard the duplicate packet and send another ACK signal to the local circuit (step 342). This helps to ensure that the local circuit will actually receive the ACK, so that the local circuit can clear its buffer and proceed with the transmission of new data.

The retry-on-error process described in connection with FIGS. 22 and 23 is merely illustrative. Any suitable retry-on-error arrangement may be used if desired.

If the optional retry-on-error feature is not implemented, programmable logic resources and/or hardwired resources on the local and remote integrated circuits are released for use in implementing other functions and/or the circuit size and complexity is reduced.

Figure 24:
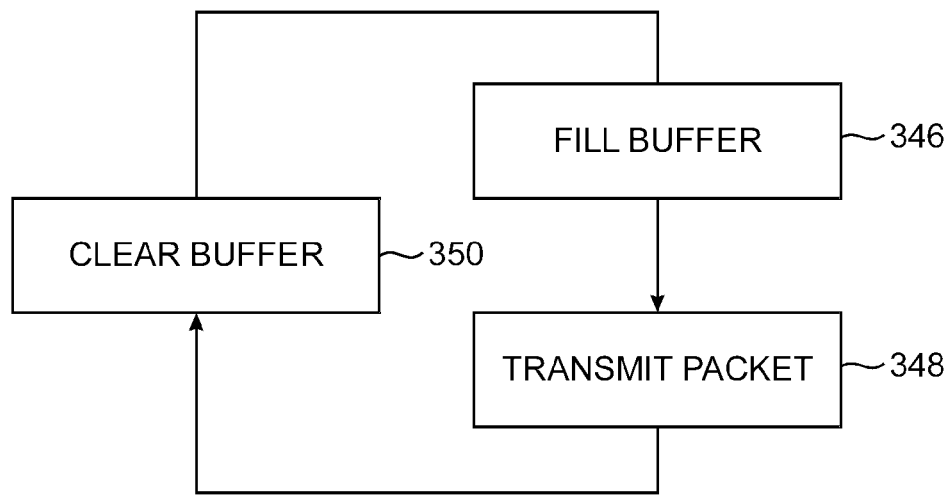
FIG. 24 is a flow chart of steps involved in transmitting data using a serial communication protocol in accordance with the present invention when the transmitting and receiving circuits do not have retry-on-error capabilities.

A flow chart of steps involved in transmitting packets from a local integrated circuit in which the optional retry-on-error feature has not been implemented is shown in FIG. 24. At step 346, the data buffer 144 is filled. After encapsulation by data encapsulation circuit 152, the packet may be transmitted at step 348. The buffer is then cleared at step 350 and new data is again placed into the buffer at step 346.

Figure 25:
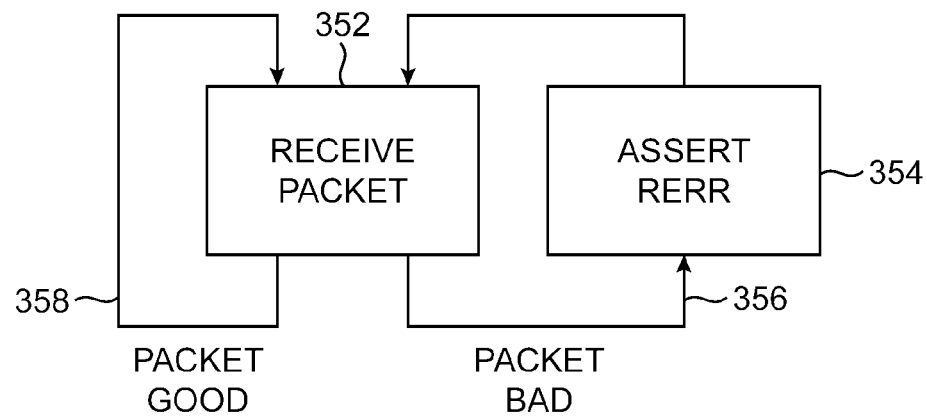
FIG. 25. is a flow chart of steps involved in receiving data using a serial communications protocol in accordance with the present invention when the transmitting and receiving circuits do not have retry-on-error capabilities.

A flow chart of steps involved in receiving packets at a remote integrated circuit in which the optional retry-on-error feature has not been implemented is shown in FIG. 25. The steps of FIG. 25 are performed at the remote integrated circuit while the steps of FIG. 24 are performed by the local integrated circuit.

At step 352, a packet is received from link 14. The receiver circuitry 116 and control circuit 160 at the remote integrated circuit examine the packet to determine whether it is a good or bad packet. If the packet is good, control loops back to step 352, as indicated by line 358. If the packet is bad, control passes to step 354, as indicated by path 356. At step 354, the remote circuit asserts an error signal RERR on the error port 192. The remote integrated circuit then receives a new packet at step 352 and the process continues.

For successful communications over link 14, the optional serial communications features of both the local and remote circuits must be compatible. For example, if the user decides to implement the retry-on-error feature in the local circuit, retry-on-error capabilities must be present at the remote circuit to assure proper communications over the link. Similarly, if the user chooses not to implement the retry-on-error feature, this feature should be omitted from both the local and remote integrated circuits, which will then operate according to the processes shown in FIGS. 24 and 25.

Figure 26:
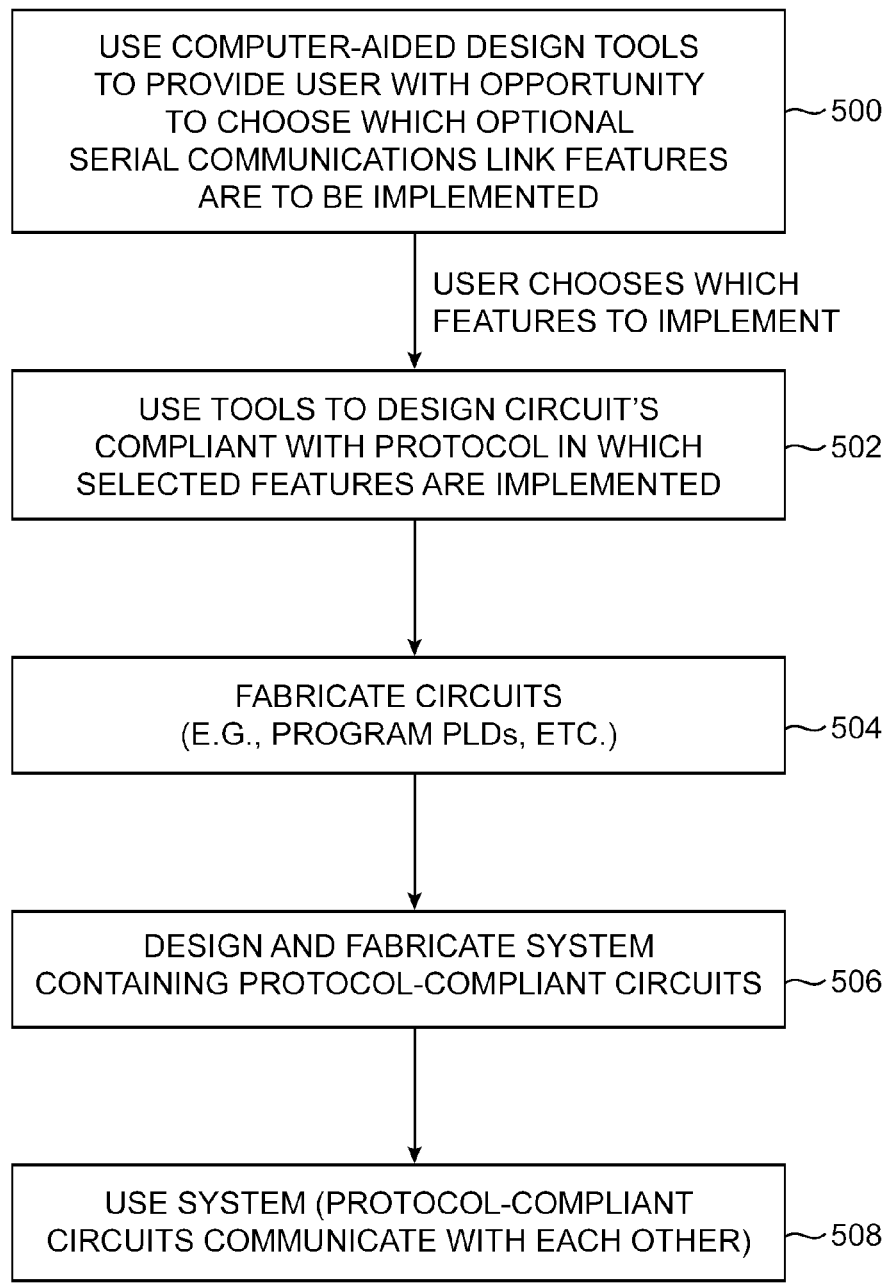
FIG. 26 is a flow chart of steps involved in designing and using integrated circuits that are compliant with a serial communications protocol in accordance with the present invention.

A flow chart of illustrative steps involved in designing and using integrated circuits that are compliant with a serial communications protocol in accordance with the present invention is shown in FIG. 26. At step 500, computer-aided design tools such as the tools 62 of FIG. 4 are used to provide the user (a single person or multiperson logic design team) with an opportunity to choose which optional serial communications link features are to be implemented. The computer-aided design tools may, for example, display on-screen options with which the user may interact by clicking on items of interest. This is merely one illustrative arrangement by which the user can provide instructions to tools 62. Any suitable arrangement may be used if desired.

When designing a given integrated circuit, the user may direct the tools to implement some or all of the optional serial communications features of the serial communications protocol. At step 502, the tools are used to design one or more integrated circuits that are compliant with the serial communication protocol and in which circuitry is included for performing the functions of the selected optional features while omitting unnecessary circuitry (i.e., circuitry for performing the omitted optional features). If a programmable logic device is being designed, the output of the tools 62 may be provided as configuration data. The output of the tools may also be provided in the form of mask set data for producing integrated circuit lithographic masks for fabricating a circuit implementing the desired design.

After the tools 62 have been used to design the circuit(s) at step 502, the circuit(s) can be fabricated at step 504 (e.g., using semiconductor fabrication techniques, by programming a programmable logic device with configuration data, etc.).

At step 506, a system may be designed and fabricated that contains circuits that are compliant with the protocol. Typically, some of the optional features will have been implemented in the circuits and some of the optional features will have been omitted from the circuits. If desired, the system may contain some protocol-compliant circuits that contain all of the optional features. The system may also contain some protocol-compliant circuits in which all of the optional features that can be omitted have been omitted. During the design and fabrication process of step 506, care should be taken to ensure that the circuits that communicate with each other over links 14 in the system are compatible with each other. For example, if the user directs tools 62 to create a given integrated circuit with four lanes in its link 14, the user should design and fabricate the system to ensure that this circuit communicates only with a corresponding four-lane circuit.

At step 508, the system constructed at step 506 may be used. Because the circuits that are communicating over links 14 are all compliant with the serial communications protocol of the invention and because they have been configured properly (by proper selection of options), the circuits communicate successfully.

The foregoing is merely illustrative of the principles of this invention and various modifications can be made by those skilled in the art without departing from the scope and spirit of the invention.

What is claimed is:

1. An integrated circuit that is compliant with a serial communications protocol having an optional clock tolerance compensation feature that has been selected by a user when designing the integrated circuit, the integrated circuit comprising:
   transmitter circuitry for transmitting data over a serial communications link;
   receiver circuitry for receiving data over the serial communications link;
   a clock tolerance compensation code generator that generates clock tolerance compensation codes; and
   control circuitry for controlling the transmitter circuitry and receiver circuitry, wherein the transmitter circuitry, receiver circuitry, and control circuitry are configured to implement the user-selected optional clock tolerance compensation feature by inserting clock tolerance compensation codes from the clock compensation code generator into the data being transmitted over the serial communications link.

2. The integrated circuit defined in claim 1 wherein the serial communications protocol has an optional retry-on-error feature that has been selected by the user when designing the integrated circuit and wherein the transmitter circuitry, the receiver circuitry, and the control circuitry are further configured to implement the selected optional retry-on-error feature.

3. The integrated circuit defined in claim 1 further comprising an idle code generator, wherein the control circuitry and transmitter circuitry are configured to insert idle codes from the idle code generator into the transmitted data when there is a gap in the data to be transmitted.

4. The integrated circuit defined in claim 1 wherein the serial communications protocol has an optional flow control feature that has been selected by the user when designing the integrated circuit and wherein the receiver circuitry and control circuitry are configured to implement the user-selected optional flow control feature to receive flow control signals and to pause the data being transmitted by the transmitter circuitry in response to the flow control signals.

5. The integrated circuit defined in claim 1 wherein the serial communications protocol has an optional lane order reversal feature that has been selected by the user when designing the integrated circuit wherein the transmitter circuitry, the receiver circuitry, and the control circuitry are further configured to implement the user-selected optional lane order reversal feature.

6. An integrated circuit that is compliant with a serial communications protocol having an optional retry-on-error feature that has been selected by a user when designing the integrated circuit, the integrated circuit comprising:
   transmitter circuitry for transmitting data over a serial communications link;
   receiver circuitry for receiving data over the serial communications link; and
   control circuitry for controlling the transmitter circuitry and receiver circuitry, wherein the transmitter circuitry, receiver circuitry, and control circuitry are configured to implement the user-selected optional retry-on-error feature by awaiting acknowledgement signals over the serial communications link.

7. The integrated circuit defined in claim 6 wherein the serial communications protocol has an optional clock tolerance compensation feature that has been selected by the user when designing the integrated circuit, the integrated circuit further comprising:
   a clock compensation code generator that generates clock compensation codes; and
   a multiplexer having an input connected to the clock compensation code generator for receiving the clock compensation codes, wherein the transmitter circuitry, the receiver circuitry, the multiplexer, and the clock compensation code generator are configured to insert the clock compensation codes into the data being transmitted by the transmitter circuitry to implement the user-selected optional clock tolerance compensation feature.

8. The integrated circuit defined in claim 6 further comprising an idle code generator, wherein the control circuitry and transmitter circuitry are configured to insert idle codes from the idle code generator into the data being transmitted when there is a gap in the data being transmitted.

9. The integrated circuit defined in claim 6 wherein the serial communications protocol has an optional flow control feature that has been selected by the user when designing the integrated circuit and wherein the receiver circuitry and control circuitry are configured to receive flow control signals and to pause the data being transmitted by the transmitter circuitry in response to the flow control signals when performing functions of the user-selected optional flow control feature.

10. A method for using logic design system computing equipment having computer-aided design tools to create an integrated circuit that is compliant with a serial communications protocol that has an optional retry-on-error feature, comprising:
with the logic design system computing equipment, using the computer-aided design tools for receiving a user selection whether to incorporate the optional retry-on-error feature into the integrated circuit;
with the logic design system computing equipment, using the computer-aided design tools to create the integrated circuit based on user selection; and
responsive to the user selection to incorporate the optional retry-on-error feature into the integrated circuit, using the computer-aided design tools to configure the integrated circuit to perform at least one of the operations selected from the group consisting of: awaiting acknowledgement signals and transmitting acknowledgement signals.

11. The method defined in claim 10 further comprising using the computer-aided design tools for receiving an additional user selection whether to incorporate an optional clock tolerance compensation feature into the integrated circuit.

12. The method defined in claim 10 wherein using the computer-aided design tools to create the integrated circuit comprises using the computer-aided design tools to create configuration data for a programmable logic device that incorporates the optional retry-on-error feature.

13. The method defined in claim 10 wherein using the computer-aided design tools to create the integrated circuit comprises using the computer-aided design tools to create specifications for a mask set for circuitry that incorporates the optional retry-on-error reversal feature.

14. The method defined in claim 10 further comprising using the computer-aided design tools for receiving an additional user selection whether to incorporate an optional link initialization feature into the integrated circuit.

15. The method defined in claim 10 further comprising using the computer-aided design tools for receiving an additional user selection whether to incorporate an optional flow control feature into the integrated circuit.

16. A method for using logic design system computing equipment having computer-aided design tools to create an integrated circuit that is compliant with a serial communications protocol that has an optional clock tolerance compensation feature, comprising:
with the logic design system computing equipment, using the computer-aided design tools for receiving a user selection whether to incorporate the optional clock tolerance compensation feature into the integrated circuit;
with the logic design system computing equipment, using the computer-aided design tools to create the integrated circuit based on the user selection; and
responsive to the user selection to incorporate the optional clock tolerance compensation feature into the integrated circuit, using the computer-aided design tools to configure the integrated circuit to perform at least one of the operations selected from the group consisting of: inserting clock tolerance compensation codes into data and removing the clock tolerance compensation codes from the data.

17. The method defined in claim 16 further comprising using the computer-aided design tools for receiving an additional user selection whether to incorporate an optional flow control feature into the integrated circuit.

18. The method defined in claim 16 wherein using the computer-aided design tools to create the integrated circuit comprises using the computer-aided design tools to create configuration data for a programmable logic device that incorporates the optional clock tolerance compensation feature.

19. The method defined in claim 16 wherein using the computer-aided design tools to create the integrated circuit comprises using the computer-aided design tools to create specifications for a lithographic mask set for circuitry that incorporates the optional clock tolerance compensation feature.

20. The method defined in claim 16 further comprising using the computer-aided design tools for receiving an additional user selection whether to incorporate an optional link initialization feature into the integrated circuit.

21. The method defined in claim 16 further comprising:
using the computer-aided design tools for receiving a first additional user selection whether to incorporate an optional flow control feature into the integrated circuit;
using the computer-aided design tools for receiving a second additional user selection whether to incorporate an optional link initialization feature into the integrated circuit; and
using the computer-aided design tools for receiving a third additional user selection whether to incorporate an optional retry-on-error feature into the integrated circuit.

* * * * *